United States Patent
Suchowski et al.

(10) Patent No.: US 11,487,185 B2
(45) Date of Patent: Nov. 1, 2022

(54) GENERATION OF BROADBAND COHERENT LASER PULSES BASED ON ADIABATIC FOUR-WAVE MIXING IN WAVEGUIDES AND FIBER

(71) Applicants: Cornell University, Ithaca, NY (US); Ramot At Tel-Aviv University Ltd., Tel Aviv (IL)

(72) Inventors: Haim Suchowski, Tel Aviv (IL); Asaf Dahan, Tel Aviv (IL); Eyal Bahar, Tel Aviv (IL); Jeffrey Moses, Ithaca, NY (US); Xiaoyue Ding, Ithaca, NY (US)

(73) Assignees: Cornell University, Ithaca, NY (US); Ramot at Tel-Aviv University LTD, Tel Aviv (IL)

( * ) Notice: Subject to any disclaimer, the term of this patent is extended or adjusted under 35 U.S.C. 154(b) by 0 days.

(21) Appl. No.: 17/055,554

(22) PCT Filed: May 14, 2019

(86) PCT No.: PCT/US2019/032286
§ 371 (c)(1),
(2) Date: Nov. 13, 2020

(87) PCT Pub. No.: WO2019/222263
PCT Pub. Date: Nov. 21, 2019

(65) Prior Publication Data
US 2021/0116782 A1    Apr. 22, 2021

Related U.S. Application Data

(60) Provisional application No. 62/671,383, filed on May 14, 2018.

(51) Int. Cl.
*G02F 1/35* (2006.01)
*G02F 1/365* (2006.01)

(52) U.S. Cl.
CPC .......... *G02F 1/3536* (2013.01); *G02F 1/3509* (2021.01); *G02F 1/365* (2013.01); *G02F 2201/02* (2013.01); *G02F 2202/32* (2013.01)

(58) Field of Classification Search
None
See application file for complete search history.

(56) References Cited

U.S. PATENT DOCUMENTS

| | | |
|---|---|---|
| 5,488,681 A | 1/1996 | Deacon et al. |
| 6,961,499 B2 | 11/2005 | Lee et al. |

(Continued)

FOREIGN PATENT DOCUMENTS

| | | |
|---|---|---|
| EP | 1518149 | 11/2011 |

OTHER PUBLICATIONS

D. Wu et al., "Broad-Band Optical Parametric Amplification in a Tapered Silicon Core Fiber Pumped in the Telecom Band," 2019 Conference on Lasers and Electro-Optics Europe & European Quantum Electronics Conference (CLEO/Europe-EQEC), 2019, pp. 1-1. (Year: 2019).*

(Continued)

*Primary Examiner* — Rhonda S Peace
*Assistant Examiner* — R. Peace
(74) *Attorney, Agent, or Firm* — Perkins Coie LLP

(57) ABSTRACT

The technology disclosed in this patent document can be used to implement an optical device for generating broadband optical pulses, including an optical waveguide having different waveguide structures at different locations along the optical waveguide and with varying dimensions or pressure gradient that change adiabatically along the different locations to enable non-linear four wave mixing over a broad spectral range.

17 Claims, 11 Drawing Sheets

(56) References Cited

U.S. PATENT DOCUMENTS

| | | | |
|---|---|---|---|
| 8,903,211 | B2 | 12/2014 | Fini et al. |
| 9,077,146 | B2 | 7/2015 | Islam |
| 9,203,209 | B2 | 12/2015 | Ramachandran |
| 10,873,302 | B2 * | 12/2020 | Tan .......................... H03F 7/02 |
| 2005/0058415 | A1 | 3/2005 | Lee et al. |
| 2005/0111499 | A1 | 5/2005 | Tanaka |
| 2006/0092500 | A1 * | 5/2006 | Melloni ................ G02F 1/3536 359/330 |
| 2011/0026103 | A1 | 2/2011 | Suchowski et al. |
| 2021/0116782 | A1 * | 4/2021 | Suchowski ........... G02F 1/3536 |

OTHER PUBLICATIONS

X. Ding et al., "Observation of Broadband Frequency Down-Conversion by Adiabatic Four-Wave Mixing in Optical Fiber," 2019 Conference on Lasers and Electro-Optics (CLEO), 2019, pp. 1-2. (Year: 2019).*

PCT Search Report and Written Opinion, Appl. No. PCT/US19/32286, dated Jul. 16, 2019, 11 pages.

Extended European Search Report, EP Appl. No. 19804468.7, dated Jan. 5, 2022, 14 pages.

Ding, et al. "Adiabatic Broadband Four-Wave Mixing Frequency Conversion Optical Fibers" 2018 Conference on Lasers and Electro-Optics (CLEO), OSA, [Online] May 13, 2018, XP033381833, 2 pages.

Suchowski et al. "Adiabatic frequency conversion of ultrafast pulses", Applied Physics B; Lasers and Optics, Springer, Berlin, DE, vol. 105, No. 4, Jun. 3, 2011, XP019983642, 6 pages.

Lau, et al. "Continuous-wave mid-infrared frequency conversion in silicon nanowaveguides", Optics Letters, Optical Society of America, US, vol. 36, No. 7, Apr. 1, 2011 (Apr. 1, 2011), XP001561636, 3 pages.

Solntsev, et al. "Combined frequency conversion and pulse compression in nonlinear tapered waveguides", Optics Letters, Optical Society of America, US, vol. 37, No. 4, Feb. 15, 2012, XP001574093, 3 pages.

Abedin, et al. "Highly nondegenerate femtosecond four-wave mixing in tapered microstructure fiber", Applied Physics Letters, American Institute of Physics, 2 Huntington Quadrangle, Melville, NY 11747, vol. 81, No. 8, Aug. 19, 2002 (Aug. 19, 2002), XP012033287, 3 pages.

* cited by examiner

FIG. 3A
FIG. 3B
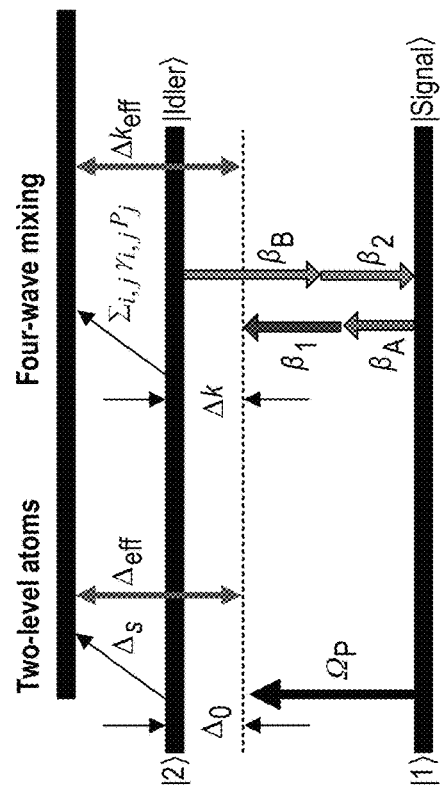
FIG. 3C

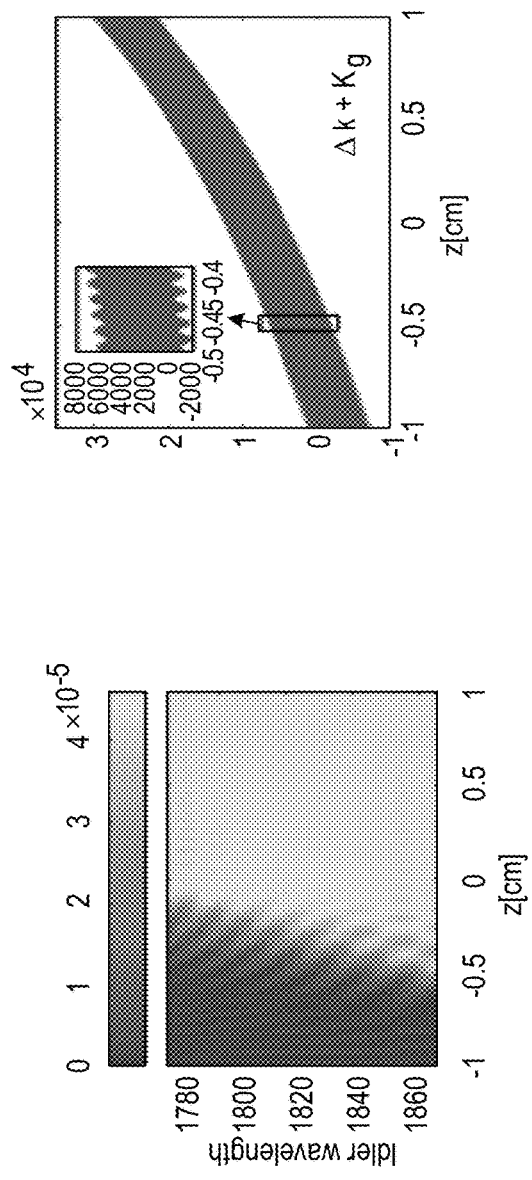
FIG. 5A
FIG. 5B
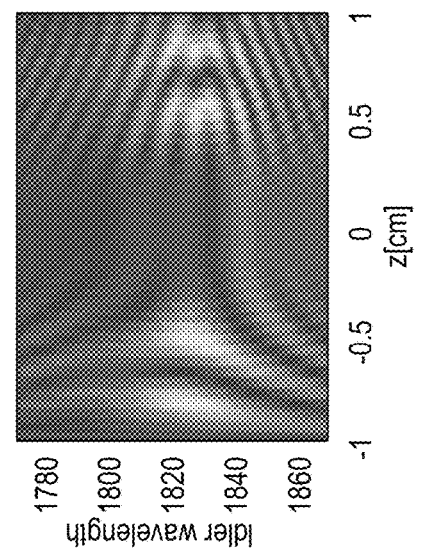
FIG. 5C
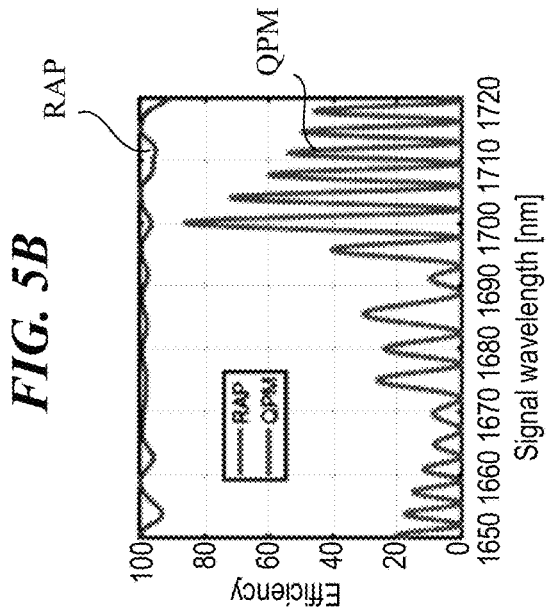
FIG. 5D

GENERATION OF BROADBAND COHERENT LASER PULSES BASED ON ADIABATIC FOUR-WAVE MIXING IN WAVEGUIDES AND FIBER

PRIORITY CLAIMS AND RELATED PATENT APPLICATIONS

This patent document is a 371 National Phase Application of PCT Application No. PCT/US2019/032286 entitled "GENERATION OF BROADBAND COHERENT LASER PULSES BASED ON ADIABATIC FOUR-WAVE MIXING IN WAVEGUIDES AND FIBER" filed on May 14, 2019 which claims the priority and benefits of U.S. Provisional Application No. 62/671,383 entitled "GENERATION OF BROADBAND COHERENT LASER PULSES BASED ON ADIABATIC FOUR-WAVE MIXING IN WAVEGUIDES AND FIBER" and filed on May 14, 2018. The entirety of the above applications is incorporated by reference as part of the disclosure of this patent document.

TECHNICAL FIELD

The technology disclosed in this patent document relates to generation, upconversion, and downconversion of optical pulses in broad spectral bands.

BACKGROUND

Ultrafast laser sources for generation short laser pulses can be used in various applications. In the past two decades, ultrashort pulse lasers oscillators and amplifiers became common equipment for fundamental scientific exploration as well as in many industrial applications. Those sources, which by their nature are broadband and coherent, allow exploring many phenomena that occur at the ultrafast time scale of scientific processes and dynamical evolutions in nature. Due to their extremely high peak power and brief duration, nonlinear optics in the ultrashort regime is of great interest in a vast number of fields, such as color generation, nonlinear spectroscopy, imaging for metallurgy, photo-induced dynamics, noninvasive background free diagnostics and the generation of new color sources. Various methods have been developed in recent years to characterize those short laser pulses, such as frequency resolved optical gating (FROG), multiphoton intra-pulse interference phase scan (MIIPS) and spectral phase interferometry for direct electric-field reconstruction (SPIDER).

Among the various nonlinear conversion processes, three wave mixing and especially second harmonic generation (SHG) became widely used. Yet, frequency conversion of the ultrashort regime remained quite complicated, as the conventional conversion device usually exhibited a tradeoff between the conversion bandwidth and the conversion efficiency, rooted in the phase mismatch between the interacting waves, which is usually compensated only for a narrow band of frequencies.

SUMMARY

The technology disclosed in this patent document can be implemented to provide techniques and devices for generating broadband coherent laser pulses based on adiabatic four wave mixing in waveguides and fiber based on adiabatic non-degenerate four-wave mixing in optical fibers and optical waveguides. In some applications, the disclosed technology can be used to achieve efficient, near-octave-spanning near-infrared to mid-infrared conversion and one-to-one ultrabroadband frequency conversion in high-repetition-rate and high-energy, strong-field applications. Applications also include the use of the technology to convert broadband pulses to another regime of the electromagnetic spectrum that is more convenient for transmission, detection, or imaging.

In one aspect, a device for generating broadband optical pulses based on adiabatic four wave mixing includes an optical waveguide having different waveguide structures at different locations along the optical waveguide and with varying dimensions that change adiabatically along the different locations to enable nonlinear four wave mixing over a broad spectral range.

In another aspect, an optical device for frequency conversion based on adiabatic four wave mixing to produce an idler laser beam includes a pump laser module to produce a pump laser beam having pump laser pulses at first and second pump laser wavelengths, a signal laser beam module to produce a signal laser beam having signal laser pulses at a signal laser wavelength, a segment of fiber or other waveguide having an input port and an output port, the input port coupled to receive the signal laser beam and the pump laser beam to exhibit optical dispersion and cubic nonlinear polarization as an adiabatic four wave mixing medium to convert energy at the signal laser wavelength into the idler laser beam at an idler wavelength either longer than or shorter than the signal laser wavelength, and an output port coupled to the output port of the segment of fiber or other waveguide to select the idler laser beam as an output of the optical device.

In another aspect, an optical device for adiabatic frequency conversion of light includes an optical path to combine signal beam and first and second pump beams, and an optical waveguide including an input port and an output port, the input port directing the combined signal beam and first and second pump beams towards a tapered fiber, a hollow fiber with a gas pressure gradient, or a tapered hollow fiber with a gas pressure gradient, the optical waveguide tapering and/or changing in pressure from the input port towards the output port of the segment of fiber with a rate satisfying one or more conditions for adiabatic four wave mixing to produce an idler beam based on the signal beam and the first and second pump beams.

BRIEF DESCRIPTION OF THE DRAWINGS

FIGS. 3A-3C show energy diagrams of two schemes of four-wave mixing, and the analogy between two-level atoms and FWM.

FIGS. 5A-5D show simulation results for adiabatically modulated waveguide.

DETAILED DESCRIPTION

Figure 1B:
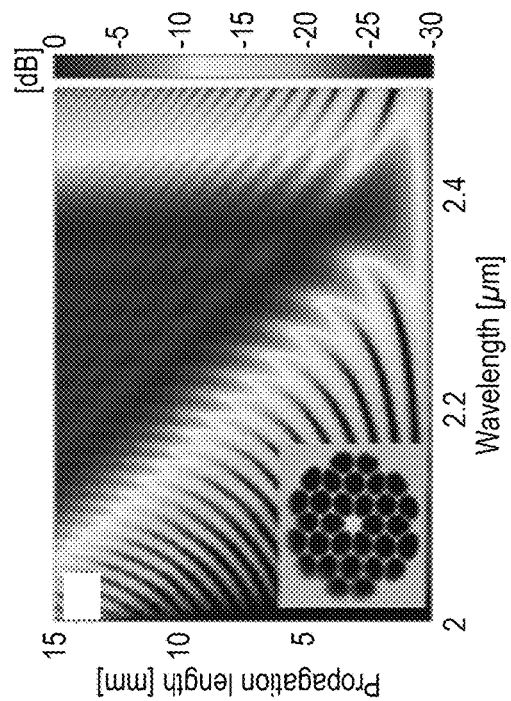
FIG. 1B shows simulated evolution of the idler spectrum resulting from adiabatic four wave mixing (FWM) in highly nonlinear PCF. The inset in the drawing shows a SEM image of modeled photonic crystal fiber (PCF).

The disclosed technology for adiabatic frequency conversions can be used to overcome the tradeoff between conversion efficiency and bandwidth for various nonlinear optical wave mixing, frequency conversion or generation processes while mitigating various technical limitations in traditional and other platforms for frequency conversion using wave mixing processes. Examples of such nonlinear optical processes include, for example, sum frequency generation (SFG), difference frequency generation (DFG), or optical parametric amplification (OPA). The disclosed technology for adiabatic frequency conversions is based on cubic optical nonlinearities in various nonlinear optical media used in optical devices, such as optical amplifiers used for telecommunications, Silicon and other semiconductor waveguides used for integrated photonics applications, gas filled capillaries used for spectral broadening of ultrashort pulses, step-index fibers, highly nonlinear fibers, and photonic crystal fibers, and other structured fibers such as Bragg fibers or GRIN fibers. The adiabatic four-wave mixing of the disclosed technology can be used for efficient robust and ultra-wideband frequency conversion in a wide variety of materials.

Efficient and robust frequency conversion of broadband optical pulses can have important applications for fields ranging from pure science to technology industries, including telecommunications, integrated photonics for the next generation of computers, environmental detection devices, and encryption methods, as well as multidimensional and strong-field spectroscopies for understanding the fundamental ultrafast dynamics of molecules and nanostructures. Much effort has been invested in developing schemes to efficiently convert broader and broader optical spectra. Yet the common paradigm of nonlinear frequency conversion with constant phase-matching in a nonlinear optical material includes a restrictive tradeoff between the conversion efficiency and its bandwidth. Even in schemes where this trade off is avoided, such as in three-wave mixing, there is a restriction in application since it is limited to devices based on specialized nonlinear optical materials engineered and grown specifically for the application, whether for ultrashort pulses or for single-frequency sources. Moreover, such nonlinear materials usually have a limited aperture size, limited transmission window, limited damage threshold, and limited interaction length. By using waveguided media with cubic nonlinearity, these limitations can be overcome.

The disclosed adiabatic frequency conversion based on four wave mixing utilizes a nonlinear optical material structured to have a spatially slow varying phase matching profile to achieve efficient and robust nonlinear mixing or frequency conversion/generation and can be implemented in in various manners. For example, waveguides can be designed using the adiabatic conversion to have better efficiency than some other FWM technologies operating in the same bandwidth. For another example, waveguides can be designed using the adiabatic conversion to possess an inert stability under harsh environmental conditions, such as dramatic temperature changes and strains, demonstrating much better performance than existing commercial crystals. For yet another example, waveguides can be designed using the adiabatic conversion to eliminate a wavelength dependent tuning of the frequency conversion setup, making the frequency conversion scheme robust in terms of handling. In implementations, various waveguide designs can be constructed by combining the above design features to achieve desired robustness, both regarding ambient conditions and easy handling.

In some implementations, the disclosed technology can be used to achieve a relatively flat conversion bandwidth response which can be used to perform broadband pulse shaping manipulations prior to the nonlinear optical conversion, thus not suffering from the spectral limitation that conventionally imposed by the limited bandwidth of birefringence or regular conversion designs, or to perform high-fidelity up-conversion or down-conversion for the sake of efficient sensing and imaging.

In some implementations, waveguides using a hollow core can employ a gas-phase medium for the nonlinear interaction that can be used to accommodate high pulse energies and multi-octave bandwidths.

Implementations of the disclosed technology include, for example, shining designed materials with light and modulating a spatial profile of the materials such as the width or the index of refraction of the material along the beam propagation direction of the different optical waves in a conversion of light into new frequencies. Simulations were conducted on some designs to demonstrate an efficient broadband four wave mixing achieving a 70 nm bandwidth with more than 90% conversion efficiency.

Rapid adiabatic passage dynamics in optical frequency conversion can provide broadband parametric conversion without back-conversion and can be used to achieve robust, broadband, full-photon-number conversion efficiency using a periodically poled bulk crystals. The linearized transfer function of spectral amplitude and phase through the process offers a simple route to pulse compression to transform limit and arbitrary shaping through pre-conversion pulse shaping, recently demonstrated with octave-spanning bandwidths in the mid-IR, producing single-cycle and arbitrarily shaped pulses at the single microjoule energy level. However, the use of poled bulk $\chi^{(2)}$ nonlinear crystals limits scalability to the high repetition rates needed for many applications or the high pulse energy needed for strong-field light-matter interactions, due to limited interaction length and aperture.

Implementation examples in this patent document provide a technique for a new concept, adiabatic four-wave mixing frequency conversion in optical fibers. In some embodiments of the disclosed technology, adiabatic frequency conversion, when extended to nondegenerate four-wave mixing (FWM) in solid- and air-core photonic crystal fibers (PCFs), retains key features from its three-wave mixing counterpart, including near-100% photon number conversion efficiency and ultrabroadband conversion far exceeding the phase-matching bandwidth, while relaxing the normal constraints on pulse energy through a long, wave-guided interaction and offering flexibility in dispersion control and wide transmission bands. Rapidly tapered core size or pressure gradients replace chirped quasi-phase matching to achieve the necessary longitudinal variation in wave-vector mismatch for adiabatic conversion. Some embodiments of the disclosed technology are predicted (by means of (1+1)-D generalized nonlinear Schrödinger equation numerical simulations capturing broadband pulse propagation) to provide 1) efficient, broadband conversion in tapered, highly nonlinear, small-core PCF and 2) efficient, energetic, near-octave-spanning conversion in negative curvature, hollow fiber (NC-HF), thus potentially enabling technologies including ultrafast, coherent, fiber-based mid-IR sources, all-fiber mid-IR frequency comb conversion, or sources for strong-field light-matter interactions.

Figure 1A:
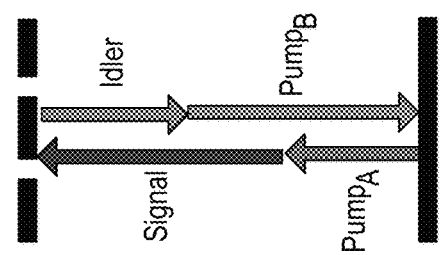
FIG. 1A shows a photon energy diagram of four-wave-mixing frequency conversion between signal and idler with two strong non-degenerate pump waves.
Figure 1D:
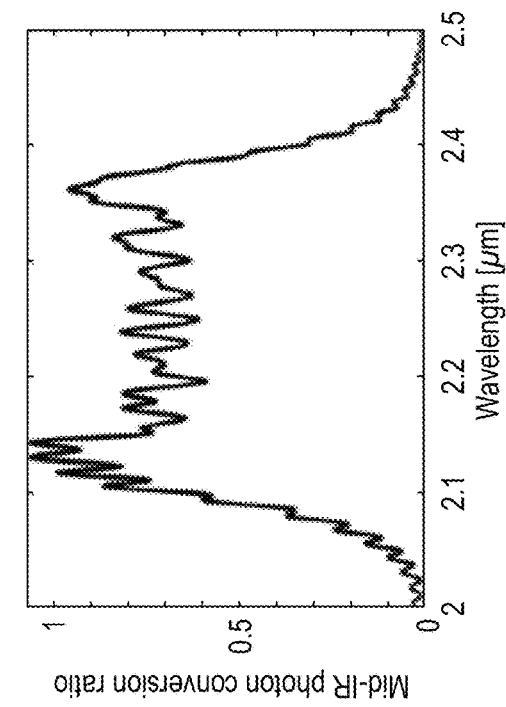
FIGS. 1C and 1D show mid-IR to near-IR photon conversion ratio vs. propagation length for selected idler wavelengths and for full spectrum at the output.
Figure 1C:
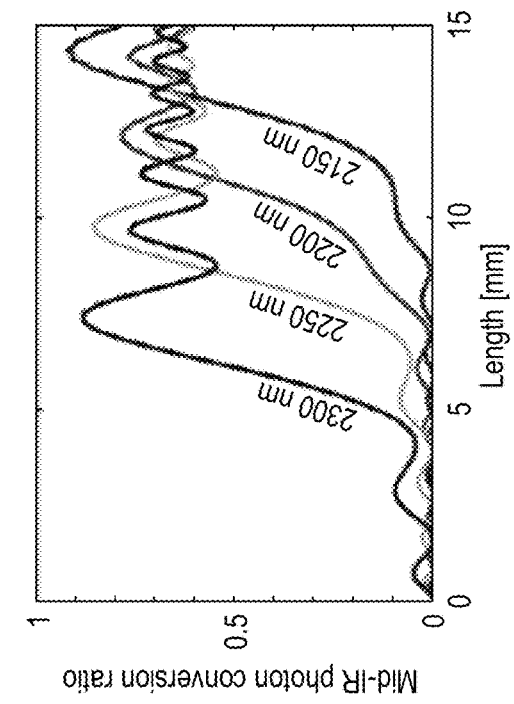

FIG. 1A shows a photon energy diagram of four-wave-mixing frequency conversion between signal and idler with two strong non-degenerate pump waves. FIG. 1B shows simulated evolution of the idler spectrum resulting from adiabatic FWM in highly nonlinear PCF. The inset in the drawing shows a SEM image of modeled PCF. FIGS. 1C and 1D show near-IR to mid-IR photon conversion ratio vs. propagation length for selected idler wavelengths (FIG. 1C) and for full spectrum at the output (FIG. 1D).

Equations of motion with SU(2) symmetry, and therefore Rabi-flopping-like dynamics, exist for interacting signal and idler waves in the nondegenerate FWM scheme shown in FIG. 1A. If the two pump waves are relatively intense, the four-field nonlinear Schrödinger equations can be transformed into a two-level Hamiltonian system:

$$\frac{d}{dz}\begin{bmatrix} C_1(z) \\ C_2(z) \end{bmatrix} = -i\begin{bmatrix} -\beta_1 - \beta_A - \sum_j \gamma_{1,j} P_j - \sum_j \gamma_{A,j} P_j & -2\sqrt{\gamma_1 \gamma_2 P_A P_B} \\ -2\sqrt{\gamma_1 \gamma_2 P_A P_B} & -\beta_2 - \beta_B - \sum_j \gamma_{2,j} P_j - \sum_j \gamma_{B,j} P_j \end{bmatrix} \begin{bmatrix} C_1(z) \\ C_2(z) \end{bmatrix} \quad \text{Eq. (1)}$$

where $C_1$ and $C_2$ are normalized amplitudes of the signal and idler waves, respectively, z is the propagation distance, and $A_i$, $\beta_i$, and $\gamma_i$, i=A, B, 1,2 are electric field envelopes, propagation constants, and fiber nonlinearity for the two non-degenerate pumps (A, B), the input signal (1), and the generated idler (2). $P_i = |A_i|^2$, i=A, B, are pump powers that remain approximately constant. $\sum_j \gamma_{(i,j)} P_j$ terms are self-/cross-phase modulation (SPM/XPM). Eq. (1) has the same form as the time-dependent Schrödinger equation of a coupled two-state atom. Therefore, if the system's effective wave-vector mismatch (off-resonance frequency) is swept from large negative value to large positive value (or vice-versa) adiabatically, the signal wave (initial state) will go through a transition such that it is fully converted to the idler wave (target state) without back-conversion as long as the adiabatic condition is met: $|d\kappa/dz^* \Delta k_{eff} - \kappa^*(d\Delta k_{eff})/dz| \ll (\kappa^2 + \Delta k_{eff}^2)^{3/2}$. Here, $\Delta k_{eff} = \beta_A + \beta_1 - \beta_B - \beta_2 + \sum_j \gamma_{A,j} P_j + \sum_j \gamma_{1,j} P_j - \sum_j \gamma_{2,j} P_j$ is the effective wave-vector mismatch and $|\kappa| = 2\sqrt{(\gamma_1 \gamma_2 P_A P_B)}$ is the nonlinear coupling strength.

The adiabatic designs in this patent document can be implemented to provide a technique for a slow longitudinal variation in $\Delta k_{eff}$ through the waveguide dispersion of a fiber taper or a pressure gradient in a hollow fiber can fulfill the phase matching and adiabatic requirements for efficient, broadband conversion. First, to address the possibility of high repetition rate mid-IR applications, such as frequency conversion of an oscillator comb or multi-photon microscopy, this patent document provides a technique that uses adiabatic conversion conditions in solid core PCFs with high numerical aperture. Various simulations were conducted to show features in the optical dispersion (with propagation constant solved by finite element method), degenerate and non-degenerate FWM, SPM/XPM, self-steepening, and spontaneous parametric generation. FIGS. 1B-1D show results using a 2.9-ps, 44-nJ, 1030-nm Gaussian pulse and its second harmonic (2 ps, 30 nJ, 515 nm) as pump pulses, and a 1-ps, 1-nJ, 650-750 nm broadband chirped pulse as the input signal, all launched into the fundamental mode. A sweep of the wave-vector mismatch is accomplished by a spatial variation profile via tapering the core radius of the PCF (see inset, FIG. 1B) from 2.1 μm to 1.8 μm over 1.5 cm, which corresponds to an idler range of 2.1~2.4 μm. FIG. 1B shows the idler range spectral evolution, showing near-IR to mid-IR photon conversion occurring sequentially by frequency and without back-conversion. This, and the asymptotic approach to near-full conversion (FIG. 1C), are the signatures of broadband adiabatic conversion. A flattop conversion profile is obtained with an average photon conversion efficiency of 80% (FIG. 1D), allowing pulse compression down to 35 fs. A different idler range can be obtained simply by tapering the PCF to different core size.

Figure 2A:
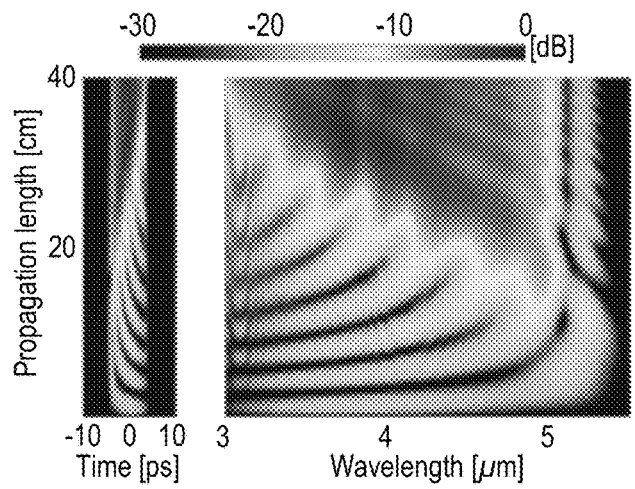
FIG. 2A shows mid-IR idler spectral and temporal profiles vs. propagation length resulting from adiabatic FWM in tapered NC-HF filled with Ar gas.
Figure 2B:
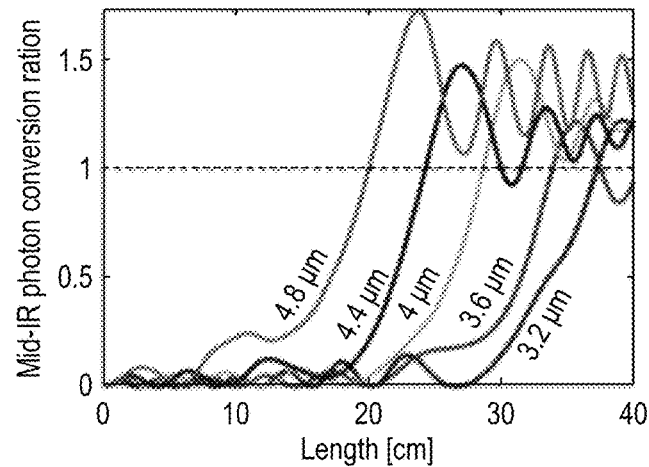
FIGS. 2B and 2C show mid-IR to near-IR photon conversion ratio vs. propagation length for selected idler wavelengths and for full spectrum at the output.
Figure 2C:
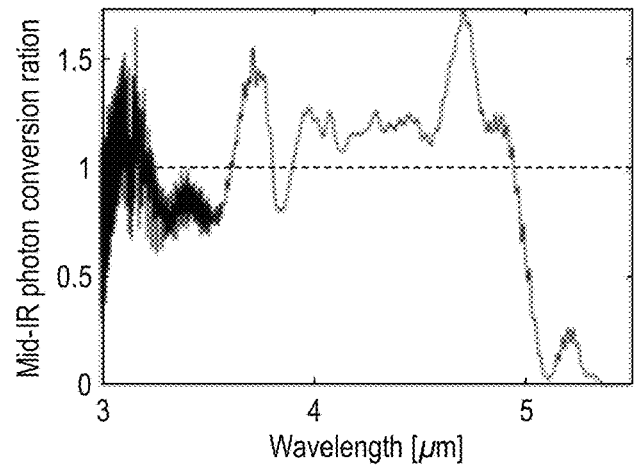

FIG. 2A shows mid-IR idler spectral and temporal profiles vs. propagation length resulting from adiabatic FWM in tapered NC-HF filled with Ar gas. FIGS. 2B and 2C show mid-IR to near-IR photon conversion ratio vs. propagation length for selected idler wavelengths (FIG. 2B) and for full spectrum at the output (FIG. 2C).

The techniques disclosed in this patent document can be used to provide high-energy, octave-spanning mid-IR generation in gradient pressurized, tapered NC-HF. An embodiment of the disclosed technology utilizes a fiber structure with transmission bands designed to cover the four nondegenerate FWM frequency bands and dispersion modeled by the Marcatili-Schmeltzer expression. Quasi-single-mode operation is assumed. FIGS. 2A-2C shows a result using 20-ps, 1.8-mJ, 1030-nm pulses and their second harmonics (14 ps, 1.3 mJ, 515 nm) as pumps, and a 5-ps, 50-0, 770850 nm broadband chirped signal as input. Phase-matching conditions for the corresponding 3-5 μm idler are found for a core radius taper from 70 μm to 55 μm over 40 cm, with a simultaneous Ar pressure gradient from 10 to 5 bar. A flat 3-5 μm idler spectrum is obtained through adiabatic conversion, resulting in a 11-μJ pulse, an order of magnitude higher than results achieved in bulk material through adiabatic three-wave mixing, and further scalable to near mJ-level through use of longer pulse durations. Here, mid-IR to near-IR photon conversion ratios greater than 1 are obtained due to slight amplification of the near-IR band by the 1030-nm pump prior to adiabatic conversion. The fringes around 3 μm are due to a parasitic FWM band only partially suppressed by the absorptive bands of the fiber. Full pulse compression to ~20 fs should be possible through pre-conversion dispersion management.

Adiabatic processes in a dynamical system occur when an external perturbation of the system varies very slowly compared to its internal dynamics, allowing the system the time to adapt to the external changes. Mathematically, it means that for the entire dynamical evolution, the system remains at one of the system's eigenmodes. These processes were investigated in many subfields in physics and engineering, ranging from adiabatic evolution in nuclear magnetic resonance, coherently excited quantum atomic systems, optical switching, waveguide arrays and recently even in quantum computation. With the use of ultra-short lasers with controllable shapes, adiabatic processes have gained practical importance for coherent manipulation of atoms and molecules, providing a robust way of steering a quantum system into desired states. Only in recent years, it was understood that adiabatic dynamical processes can play a significant role also in optical frequency conversion, suggesting alternative schemes for efficient conversion.

Using standard frequency conversion techniques, one could achieve either complete frequency conversion for narrowband spectrum or inefficient conversion for broad bandwidth. The introduction of adiabatic frequency conversion resolved the bandwidth-efficiency trade-off, and achieved efficient scalable broadband frequency conversion. Adiabatic dynamics in frequency conversion was first theoretically suggested for second harmonic generation (SHG), predicting robust conversion of fundamental light source to its second harmonic. The analogy between coherently excited multi-level quantum systems and electromagnetic waves coupled by an undepleted pump wave in a nonlinear crystal was introduced, suggesting and experimentally realizing the concept of Rapid Adiabatic Passage (RAP) in frequency conversion. In a set of experiments, a robust broad bandwidth conversion with very high efficiency for sum frequency generation (SFG) from the near-IR into the visible has been performed. It was confirmed that the conversion process is insensitive to small changes in parameters that affect the phase mismatch such as crystal temperature, interaction length, angle of incidence, and input wavelength. The method was applied successfully to the up-conversion and down-conversion of ultrashort pulses, where conversion of Ti:S oscillator pulses with near-100% efficiency for ultrabroadband spectrum has been obtained, allowing the generation of high-energy, multi-octave-spanning IR pulsed sources.

The concept of adiabatic evolution has been extended beyond RAP mechanism by introducing analogous schemes of adiabatic dynamics of coherently excited multi-level quantum systems into frequency conversion, predicting and demonstrating new and unique phenomena. Two such novel schemes are adiabatic elimination mechanisms and the introduction of a scheme analogous to Stimulated Raman Adiabatic Passage (STIRAP) from three level atomic dynamics, providing complete frequency conversion through a highly absorptive frequency band. In the case of adiabatic elimination, it was shown that in addition to the material dispersion, phase matching also depends on the pump intensities, in analogy to the Stark shift in atomic systems. Another method directly extends the basic approach, facilitating efficient broadband multi-process frequency conversion between very far or near frequencies.

Recently, the restriction of the undepleted pump assumption in the analysis, which linearizes the dynamics, was removed, thereby allowing the exploration of adiabatic processes in the fully nonlinear dynamics regime of nonlinear optics, in which all the interacting waves may be depleted or amplified. Experimental results have already been obtained for optical parametric amplification (OPA), and the analysis is expected to significantly expand the use of the method to other nonlinear processes such as four wave mixing (FWM).

The scheme described in this patent document can have broad applicability as a post-amplification method for near-IR to mid-IR conversion and potentially allowing single-cycle pulsed sources. For example, it is immediately suited for the seeding of an OPA or an OPCPA where one of the pump beams of the adiabatic four wave mixing process serves as a pump beam for the OPA or OPCPA process. Using the scalability of the design, the adiabatic four wave mixing technique could potentially be used to generate multiple-octave-spanning spectra (i.e. having bandwidth that contains wavelengths and their harmonics), and allowing the generation of the shortest pulse mid IR source possible.

Adiabatic Four-Wave Mixing Frequency Conversion

Efficient and robust frequency conversion of broadband optical pulses is essential for fields ranging from pure science to technology industries, including telecommunications, integrated photonics for the next generation of computers, environmental detection devices, encryption methods, as well as strong field applications such as X-ray generation and multidimensional spectroscopies for understanding the fundamental ultrafast dynamics of molecules.

The adiabatic frequency conversion concept implemented in three wave mixing processes offers the ability to sidestep efficiency-bandwidth trade-offs in nonlinear frequency conversion due to sensitivity of the standard phase-matching. The adiabatic character of the conversion both dramatically increases the available bandwidth in these applications while also ensuring a high conversion efficiency. Application of this concept to three-wave mixing in aperiodically poled quasi-phase-matched media, as undertaken by the investigators, allowed the generation of phase- and amplitude-controlled, octave-spanning, coherent mid-IR light sources by means of adiabatic three-wave mixing processes. Moreover, the amplitude and phase transferring qualities of adiabatic frequency conversion allowed amplitude and phase tunability by pulse shaping prior to conversion, allowing great flexibility for spectroscopic applications. Though very promising, the traditional platforms for frequency conversion using three-wave mixing processes, such as sum-frequency generation (SFG), difference-frequency generation (DFG), optical parametric amplification (OPA), and optical parametric oscillation (OPO), are limited to devices based on specialized materials engineered and grown specifically for the application, whether for ultrashort pulses or for single-frequency sources.

In contrast, the ubiquitous presence of cubic optical nonlinearities enables all devices employing light propagation the capacity for frequency conversion. Examples include optical amplifiers used for telecommunications, Silicon and other semiconductor waveguides used for integrated photonics applications, and gas filled capillaries used for spectral broadening or parametric amplification of ultrashort pulses. In each of these technologies, four-wave mixing (FWM) frequency conversion has been employed. In addition, FWM frequency converters have also appeared in other settings, such as highly nonlinear and photonic crystal fibers. Like all nonlinear frequency conversion, application of FWM to the generation of broadband light sources are limited by a trade-off between efficiency and bandwidth.

Furthermore, the commonly used technique for frequency conversion, cascaded FWM [22-25], does not allow flexible control of the spectral phase of the converted light.

Here, we introduce the concept of adiabatic frequency conversion for FWM, which we find broadly applicable to $\chi_{(3)}$ nonlinear platforms. We develop a theoretical framework for rapid adiabatic passage in FWM, analogous to the dynamics of quantum two-level systems. We show that a conversion efficiency asymptotically approaching 100% over broad bandwidth can be achieved if the adiabatic condition is met, overcoming the traditional efficiency-bandwidth trade-off in common FWM frequency conversion processes. Moreover, we apply the theory to Silicon photonics and step-index fibers, two of the $\chi_{(3)}$ nonlinear platforms most widely used in applications, using a generalized beam propagation simulation. We find near-100% photon conversion efficiency can be achieved by a simple longitudinal tuning of waveguide dispersion, generating broad bandwidths into both near-IR and mid-IR wavelength ranges This patent document discloses the SU(2) symmetry present in FWM frequency conversion under the strong pump approximation, which illuminates the similarity of photon conversion in FWM to population exchange in two-level systems. This patent document also discloses the conditions for achieving adiabatic passage in FWM. Compared to adiabatic evolution in $\chi(2)$ media, several new characteristics are observed. This patent document also discloses generalized propagation equations for FWM derived from Maxwell's equations, capturing the full frequency- and time-domain nonlinear pulse propagation effects for waveguided interactions, including exact broadband dispersion, self- and cross-phase modulation, degenerate and non-degenerate FWM, and spontaneous FWM amplification. This patent document discloses implementations that numerically solve the generalized equations in order to explore silicon photonics device and optical fiber platforms for realizing AFWM. For silicon photonic devices, an AFWM solution is presented that does not require a strong pump condition. Generation of a bandwidth of 70 nm centered at 1820 nm is simulated with a photon conversion ratio (PCR) greater than 90%, the first solution for such wide spectral widths with high conversion efficiency. For step-index fibers, we discuss the optimal fiber parameters for phase matching AFWM frequency conversion. By modeling a commercially available fluoride tapered step-index fiber, we predict that nanojoule energy, 4.2-5.2-μm broadband mid-infrared (mid-IR) light could be realized by an all-fiber based system, being among the most energetic mid-IR fiber sources in this spectral range. We believe our findings will open new routes for achieving energetic and broadband generation over frequency ranges where other methods suffer from either low spectral power or narrow bandwidth due to the efficiency-bandwidth trade-off, such as frequency conversion in on-chip photonic devices for telecom and innovative computers, as well as fiber-based mid-IR sources for high-repetition-rate spectroscopy or low-repetition-rate high-intensity applications I. Concepts and Theory 1. Analogy to Population Transfer in a Two-Level System Possessing SU(2) Symmetry FIGS. 3A-3C show energy diagrams of two schemes of four-wave mixing, and the analogy between two-level atoms and FWM. FIG. 3A shows annihilation of Signal and Pump A photons allows creation of Idler and Pump B photons. FIG. 3B shows annihilation of a Signal photon allows creation of Pump A, Pump B, and Idler photons. In both cases, when pump intensities are much larger than those of the signal and idler, signal and idler photons are exchanged through coupled equations of motion possessing SU(2) symmetry, analogously to coupled two-level quantum systems. FIG. 3C shows analogy between Stark-chirped two-level atomic systems and four-wave mixing. Frequency detuning $\Delta\theta$ corresponds to phase mismatch $\Delta k$, while Stark-induced energy shift $\Delta S$ corresponds to Kerr-induced nonlinear phase modulation $$\frac{\gamma_{int}}{2}(\omega_B P_B - \omega_A P_A).$$

As in three-wave mixing processes, under certain conditions photon transfer in a FWM process can be understood by analogy to population transfer in a two-level quantum atom possessing SU(2) symmetry. These are the conditions under which a fully adiabatic, one-to-one transfer of photons between frequencies becomes possible. Consider FWM in a $\chi_{(3)}$ nonlinear medium. Consider initial photon numbers $|n_A\rangle$, $|n_B\rangle$, $|n_{sig}\rangle$, and $|n_{Idl}\rangle$, for Pump$_A$, Pump$_B$, Signal, and Idler waves, respectively. When satisfying the conditions nA, nB>>nSig, nIdl under either scheme, an exchange of n photons will leave the four waves with approximate photon numbers $|n_A\rangle$, $|n_B\rangle$, $|n_{sig}-n\rangle$, and $|n_{Idl}+n\rangle$. An exchange of photons between four waves is thus approximately reduced to a one-to-one photon number transfer between the signal and idler waves, resembling population exchange in a two-level quantum system. Experimentally, these conditions can be met if the intensities of the two pumps are assumed to be much stronger than those of the signal and idler waves.

To mathematically demonstrate the concept, we start with simplified nonlinear Schrödinger equations under strong pump and monochromatic wave approximations:

$$i\frac{dA_A}{dz} = \omega_A\left(\frac{\mu_{A,A}}{2}|A_A|^2 + \mu_{A,B}|A_B|^2\right)A_A \quad \text{Eq. (2)}$$

$$i\frac{dA_B}{dz} = \omega_B\left(\mu_{A,B}|A_A|^2 + \frac{\mu_{B,B}}{2}|A_B|^2\right)A_B$$

$$i\frac{dA_{Sig}}{dz} = \quad \text{Eq. (3)}$$
$$\omega_{Sig}[(\mu_{Sig,A}|A_A|^2 + \mu_{Sig,B}|A_B|^2)A_{Sig} + \gamma_{int}A_A^*A_B A_{Idl}e^{-i\Delta kz}]$$

$$i\frac{dA_{Idl}}{dz} = $$
$$\omega_{Idl}[(\mu_{Idl,A}|A_A|^2 + \mu_{Idl,B}|A_B|^2)A_{Idl} + \gamma_{int}A_A^*A_B A_{Sig}e^{-i\Delta kz}]$$

Ai is the electric field envelope and μi, j (with i, j=A, B, Sig, Idl) and γint are nonlinear coupling coefficients for the two non-degenerate pumps (A, B), signal (Sig), and idler (Idl) waves. $\Delta k = \beta A + \beta Sig - \beta B - \beta Idl$ is the wave-vector mismatch arising from dispersion of the propagation constants of the waveguided $\chi_{(3)}$ nonlinear medium. Under the undepleted pump approximation, the pump magnitudes are approximately constant, and their envelopes acquire only phase modulations due to self- and cross-phase modulation (SPM, XPM) during propagation ($P_i=|A_i|^2$ for i=A, B, remain constant). The phases of Pump A and Pump B are modulated by $$\omega_A\left(\frac{\mu_{A,A}}{2}P_A + \mu_{A,B}P_B\right) \text{ and } \omega_B\left(\mu_{B,A}P_A + \frac{\mu_{B,B}}{2}P_B\right),$$

accordingly. SPM and XPM between signal and idler waves are ignored due to their small amplitudes compared to the pumps. However, the signal and idler waves experience XPM from the pump waves, $\omega_{sig}(\mu_{Sig,A}P_A + \mu_{Sig,B}P_B)$ and $\omega_{Idl}(\mu_{Idl,A}P_A + \mu_{Idl,B}P_B)$ as well as a mutual power transfer. By approximating the nonlinearity to be frequency independent, s.t. $\mu_{i,j} = \gamma_{int}$ and introducing normalized amplitudes $$C_{Sig} = \frac{A_{Sig}\exp\left(i\frac{1}{2}\left(\Delta k + \gamma_{int}\left(2\omega_{Sig}(P_A + P_B) + \frac{1}{2}(\omega_A P_A - \omega_B P_B)\right)\right)z\right)}{\sqrt{\omega_{Sig}\gamma_{int}|A_A||A_B|}} \text{ and}$$

$$C_{Idl} = \frac{A_{Idl}\exp\left(-i\frac{1}{2}\left(\Delta k - \gamma_{int}\left(2\omega_{Idl}(P_A + P_B) - \frac{1}{2}(\omega_A P_A - \omega_B P_B)\right)\right)z\right)}{\sqrt{\omega_{Idl}\gamma_{int}|A_A||A_B|}},$$

the coupled amplitude equations (CAEs) for the signal and idler waves (2) can be rearranged into the form:

$$\frac{dC_{Sig}(z)}{dz} = i\frac{\Delta k_{eff}}{2} \cdot C_{Sig}(z) + i\frac{\kappa}{2} \cdot C_{Idl}(z) \quad \text{Eq. (4)}$$

$$\frac{dC_{Idl}(z)}{dz} = i\frac{\kappa}{2} \cdot C_{Sig}(z) - i\frac{\Delta k_{eff}}{2} \cdot C_{Idl}(z) \quad \text{Eq. (5)}$$

where the effective wave-vector mismatch is $$\Delta k_{eff} = \Delta k + \omega_A\left(\frac{\mu_{A,A}}{2}P_A + \mu_{A,B}P_B\right) +$$

$$\omega_{Sig}(\mu_{Sig,A}P_A + \mu_{Sig,B}P_B) - \omega_B\left(\mu_{B,A}P_A + \frac{\mu_{B,B}}{2}P_B\right) -$$

$$\omega_{Idl}(\mu_{Idl,A}P_A + \mu_{Idl,B}P_B) = \Delta k + \frac{\gamma_{int}}{2}(\omega_B P_B - \omega_A P_A),$$

and the coupling strength between the two waves is $\kappa = 2\sqrt{\omega_{Sig}\omega_{Idl}\gamma_{int}^2 P_A P_B}$. This set of CAEs describing the wave mixing resembles the form of the SU(2) symmetric time-dependent Schrödinger equations of a coupled two-state atom except that time evolution in the quantum model has now become z propagation in the $\chi_{(3)}$ nonlinear medium. The analogous quantities are summarized in Table 1 and are depicted in FIG. 3C. Whereas in an optically driven two-level atom, an effective detuning of the driving laser frequency

TABLE 1

Analogy of FWM to a coupled 2-level atom

| Parameter | 2-level atom | Four-wave mixing |
|---|---|---|
| Evolution parameters | time | z axis |
| Detuning/Phase mismatch | $\Delta 0$ | $\Delta \kappa$ |
| Stark shift | $\Delta S$ | $\frac{\gamma_{int}}{2}(\omega_B P_B - \omega_A P_A)$ |
| Coupling coefficient | $\kappa$ | $\kappa = 2\sqrt{\omega_{Sig}\omega_{ID}\gamma_{int}^2 P_A P_B}$ |

Whereas in an optically driven two-level atom, an effective detuning of the driving laser frequency from resonance, $\Delta_{eff}$, is a sum of the detuning in the field-free case, $\Delta 0$, and a Stark energy shift, $\Delta S$, the quantity analogous to an effective detuning for an exchange of the signal and idler wave amplitudes is an effective wave-vector mismatch, $\Delta k_{eff}$, which is a sum of the intrinsic wave-vector mismatch (i.e., when Pump A and Pump B have zero intensity), $\Delta k = \beta_{Sig} + \beta_A - \beta_{Idl} - \beta_B$, and XPM-induced phase modulations $$\frac{\gamma_{int}}{2}(\omega_B P_B - \omega_A P_A)$$

that become important at high pump intensity. The coupling between the signal and idler states, $\kappa$, depends on both the nonlinear susceptibility and the two pump intensities.

2. Adiabatic Passage

Because of the close analogy, the evolution dynamics of FWM under the undepleted pump approximation and with a photon exchange as drawn in FIGS. 3A-3C can be expected to follow the known dynamics of SU(2) symmetric coupled two-level atomic systems. The simplest analogy is the case of constant $\Delta k_{eff}$, in which the difference between signal and idler photon numbers oscillates at the Rabi frequency, $\sqrt{\kappa^2 + \Delta k_{eff}^2}$.

As is the case in experimental atomic physics, Rabi flopping can be used to achieve a complete population inversion (in this case meaning all signal photons are converted to idler photons, or vice-versa, depending on which field has a nonzero initial amplitude), but only if the coupling lasts for exactly one-half of a Rabi oscillation and the detuning is zero. Thus, the final population is highly sensitive to the experimental parameters and is wavelength dependent.

A second example is rapid adiabatic passage (RAP), which can be used to asymptotically achieve 100% population transfer from an initial state to a target state through a slowly swept energy detuning. Since the CAEs of our FWM model shares the same mathematical form as a two-level atomic system, RAP should also exist in FWM. In FWM, if the effective wave-vector mismatch is swept from large positive value to large negative value (or vice-versa) adiabatically, the signal wave (initial state) shall fully convert to the idler wave (target state) without back-conversion. It can be shown that the condition required for adiabatic following in AFWM is:

$$|k\Delta k_{eff} - \kappa\Delta k'_{eff}| \ll (\kappa^2 + \Delta k_{eff}^2)^{\frac{3}{2}} \quad \text{Eq. (6)}$$

where the derivatives are with respect to propagation distance, z. Additionally, to ensure a robust adiabatic conversion, at both the beginning and end of the photon exchange, $|\Delta k_{eff}| \gg \kappa$ is required, i.e., the coupling between waves should be insignificant.

Nearly 100% photon conversion efficiency is expected to be achieved between signal and idler waves through AFWM if the adiabatic condition is fulfilled, as has been demonstrated in $\chi(2)$ nonlinear media using a swept wave-vector mismatch created by aperiodically poled gratings. Moreover, if the dispersion experienced by broadband pulses does not upset the coupling between fields (through group-velocity walk-off, for example) a RAP-like frequency transfer can occur for each frequency within a broadband signal pulse in a single nonlinear medium if the adiabatic condition is met for each frequency independently. Greater than octave-spanning bandwidths have been achieved through adiabatic three-wave mixing. The process is also expected to exhibit a linear transfer function of spectral phase and amplitude if the pump pulses have a relatively narrow bandwidth compared to the signal and idler pulses, as has also been demonstrated for RAP in three-wave mixing, offering a simple route towards arbitrary pulse shaping of the generated idler through pre-conversion amplitude and phase shaping of the signal. We note that the distinguishing features of the driven two-level system analogy for FWM versus three-wave mixing include first, that two nondegenerate pump waves are required to achieve SU(2) symmetric frequency conversion between signal and idler waves rather than one pump wave, and second, that the effective wave-vector mismatch $\Delta k_{eff}$ is not only dependent on propagation constants $\beta i$, but also Kerr-induced nonlinear phase modulations $$\frac{\gamma_{int}}{2}(\omega_B P_B - \omega_A P_A).$$

These features allow a wide range of possible implementations of RAP that are unique to the FWM system, including the possibility of a swept effective wave-vector mismatch derived from longitudinally increasing or decreasing phase modulations imparted by the two non-degenerate pumps (achieved through group-velocity walk-off, for example), an analogy of Stark-chirped rapid adiabatic passage. In the case that a waveguided structure is used for the FWM interaction, RAP can be achieved through a longitudinal sweep of the waveguide dispersion. Two examples of waveguide-enabled AFWM will be discussed.

II. Generalized Propagation Model

To rigorously treat the AFWM processes in $\chi(3)$ nonlinear media through numerical modeling, we seek a generalized AFWM theory, that captures full frequency and time domain pulse propagation for arbitrary mode profiles such that it captures arbitrary propagation models including waveguides varying in geometry and in material. We start by mathematically analyzing the most general interaction of four wave mixing, which include both the temporal and the spectral characteristics of the incoming pulse profiles. We derive and present a set of equations in the frequency domain that are followed via a time domain analysis. This derivation is unique in the sense that it is suitable for the interaction of ultrafast pulses with variable power-strengths and versatile spectral bandwidth. Our analysis includes also the 3rd order nonlinear processes of Kerr effect and two-photon absorption, following a solution in which we find the compatible conditions, based on the recognition that under the quasi-monochromatic strong pump approximation our equations identify with equations 35 and 36, which as discussed above possesses SU(2) symmetry, to achieve almost perfect conversion efficiency without any need to assume any quasi-monochromaticity or undepleted pump approximations. We start by deriving the fully nonlinear dynamical equations for a wave guided system dictated by Maxwell's equations. We present the full nonlinear equations both in frequency and time domain for a non-over-lapping four wave mixing process in a centrosymetric medium. With the use of Maxwell's equations and wave guide mode approach, the nonlinear master equation is $$\frac{dA(z,\omega)}{dz} = -i\omega \int\int \overline{P}_{NL}(x,y,w) \cdot (\overline{E}_t^\dagger e^{i\beta(z,\omega)z}) dx dy \quad \text{Eq. (7)}$$

where $A(z, \omega)$ is the field amplitude spectral density for the transverse electric field following $$E_t(x, y, t) = \int_{-\infty}^{\infty} \frac{d\omega}{2\pi} \frac{1}{2}[A(z,\omega) + A^\dagger(z,-\omega)]\overrightarrow{E}_t(x,y,\omega)e^{-i\beta(z,\omega)z}e^{i\omega t} \text{ and } \overline{P}_{NL}$$

is the nonlinear polarization defined accordingly, $\frac{1}{2}[A(z,\omega)+A^\dagger(z,-\omega)]\overrightarrow{E}_t(x,y,\omega)e^{-i\beta(z,\omega)z} \equiv \overline{E}_t(z,\omega)$, the ( )t stands for the transverse mode of the electric field, $\beta(z,\omega)$ is the propagation constant inside the waveguide.

In the case of centrosymetric material the 3rd order nonlinear coefficient tensor is $$\chi^{(3)}_{xxxx} = \chi^{(3)}_{yyyy} = \frac{\chi^{(3)}_{\{yyxx\}}}{3}$$

where the { } stands for all permutation and the nonlinear polarization take the form of $\overline{P}_{NL,k}=\epsilon_0\chi^{(3)}\Sigma_{j\in x,y}\overline{E}_j(x,y,w)^*\overline{E}_j(x,y,w)^*\overline{E}_k(x,y,w)$ which result in the equation, $$\frac{dA(z,\omega)}{dz} = \quad \text{Eq. (8)}$$

$$-i\omega\chi^{(3)}e^{i\beta(z,\omega)z}\int\int\sum_{k\in x,y} \overline{P}_{NL,k} \cdot (\overline{E}_{tk}(x,y,w)^{\dagger dagger})dxdy$$

In this patent document, various embodiments of the disclosed technology are implemented based on FWM scheme 1 from FIG. 3A. For each pulse we denote a field amplitude spectral density as in Eqs. (2)-(3) which now takes the form of optical pulses, e.g. the spectral density is $A(z, w)=A_A(z,w)+A_B(z,w)+A_{sig}(z,w)+A_{Idl}(z,w)$ with $A_v(z, w)$ being envelopes centered around $\omega_v$. Implementing the four-waves into the polarization's, and approximating non-overlapping spectral components among them, yields a set of nonlinear coupled equations where for example, for Signal wave we obtain:

$$\frac{dA_{Sig}(z,\omega)}{dz} = -i\omega\epsilon_0\chi^{(3)}e^{i\beta(\omega)z} \times \quad \text{Eq. (9)}$$

$$\Big[\gamma A_B(\omega)e^{-i\beta(\omega)z} * A_{Idl}(\omega)e^{-i\beta(\omega)z} * A_A^\dagger(-\omega)e^{-i\beta(\omega)z} +$$

$$\frac{\mu_{Sig,Sig}}{2}A_{Sig}(\omega)e^{-i\beta(\omega)z} * A_{Sig}^\dagger(-\omega)e^{-i\beta(\omega)z} * A_{Sig}(\omega)e^{-i\beta(\omega)z} +$$

$$\mu_{Sig,Idl}A_{Idl}(\omega)e^{-i\beta(\omega)z} * A_{Idl}^\dagger(-\omega)e^{-i\beta(\omega)z} * A_{Sig}(\omega)e^{-i\beta(\omega)z} +$$

$$\mu_{Sig,A}A_A(\omega)e^{-i\beta(\omega)z} * A_A^\dagger(-\omega)e^{-i\beta(\omega)z} * A_{Sig}(\omega)e^{-i\beta(\omega)z} +$$

$$\mu_{Sig,B}A_B(\omega)e^{-i\beta(\omega)z} * A_B^\dagger(-\omega)e^{-i\beta(\omega)z} * A_{Sig}(\omega)e^{-i\beta(\omega)z}\Big]$$

The notation of † was inserted as complex conjugate, z dependence was dropped from $A_v$ and $\beta$ for clarity e.g. $A(w)=A(z, w)$, * stands for the convolution product and we defined the following overlap integrals of the electric field profile as $\gamma=\frac{1}{2}\iint d\, xdy[(\overrightarrow{E}_B\cdot\overrightarrow{E}_{Idl})(\overrightarrow{E}_A\cdot\overrightarrow{E}_{sig})+(\overrightarrow{E}_B\cdot\overrightarrow{E}_A)(\overrightarrow{E}_{Idl}\cdot\overrightarrow{E}_{sig})+(\overrightarrow{E}_{Idl}\cdot\overrightarrow{E}_A)(\overrightarrow{E}_B\cdot\overrightarrow{E}_{sig})]$ and $\mu_{i,j}=\frac{1}{2}\iint d\, xdy\,(|\overrightarrow{E}_i|^2|\overrightarrow{E}_j|^2+2|\overrightarrow{E}_i\cdot\overrightarrow{E}_j|^2)$.

One should note that the definition and construction of the overlap integrals does not prohibit the fields to overlap thus maintaining all possible 3rd order calculations still valid. Due to the convolution product naturally appearing in these equations, it is more natural to introduce the full set of equations in the time domain, For the time domain we define $B_v(z, \omega) = A_v(z, \omega)e^{-i\beta(z,\omega)z}$. One can deduce the following set of equations, for example, for B1 (z, t):

$$i\frac{dB_{Sig}(z, t)}{dz} = +\mathcal{F}^{-1}[\partial_Z(\beta(z, \omega)z)B_{Sig}(z, \omega)] \leftarrow \text{Dispersion} + \varepsilon_0\chi^{(3)}\mathcal{F}^{-1}[\omega\mathcal{F}[\gamma B_B(z, t)B_{Idl}(z, t)B_A^*(z, t)]] \leftarrow \text{FWM} + \varepsilon_0\chi^{(3)}\mathcal{F}^{-1}\left[\omega\mathcal{F}\left[\sum_{v \in A,B,Idl} \mu_{Sig,v}|B_v(z, t)|^2 B_{Sig}(z, t)\right]\right] \leftarrow \text{XPM}\varepsilon_0\chi^{(3)}\mathcal{F}^{-1}\left[\omega\mathcal{F}\left[\frac{\mu_{Sig, Sig}}{2}|B_{Sig}(z, t)|^2 B_{Sig}(z, t)\right]\right] \leftarrow \text{SPM}$$

Eq. (10)

where $\mathcal{F}$ is the Fourier transform operator. The first term can be understood as the dispersion dynamics, second term is the exchange of energy between the 4 waves, third and fourth are the cross and self modulations accordingly. In addition γ and μi,j can be understood as the interaction strength parameters. Eq. (10) is the most general form of a four wave mixing process in a centrosymetric waveguide where the 3rd order nonlinearity dependence on frequency is weak, and under the approximation that the four waves' electric field profiles have non-overlapping spectral components.

III. Applications

AFWM can be achieved by longitudinal variation of either the effective wave-vector mismatch, $\Delta k_{eff}$, or the coupling strength, K. Some embodiments of the disclosed technology provide straightforward control of the adiabatic condition through the waveguide geometry, which presents a controllable knob for tuning the propagation constants through waveguide dispersion and for tuning the overlap factors. Some embodiments of the disclosed technology utilize longitudinal variations to the waveguide geometry to achieve the adiabatic condition of Eq. (6). Two distinct approaches are investigated. In the case of silicon waveguides, an aperiodic quasi-phase matching (QPM) approach is employed, utilizing cyclic modulations of the waveguide width to modulate the nonlinear coupling coefficients. This gives rise to a longitudinally varying effective momentum that can be used to offset the wave-vector mismatch. In the case of optical fibers, a linear variation of fiber core diameter is used to achieve a monotonic longitudinal sweep of $\Delta k_{eff}$ through its effect on the waveguide dispersion.

In order to fulfill the adiabatic condition of Eq. (6), a tunable knob must be realized with high enough accuracy. Methods to fulfill this are through adiabatically adjusting: a) the dispersion of the participating four waves or b) the modulation period of nonlinear coupling strength.

1. Silicon Photonic Devices

Figure 4:
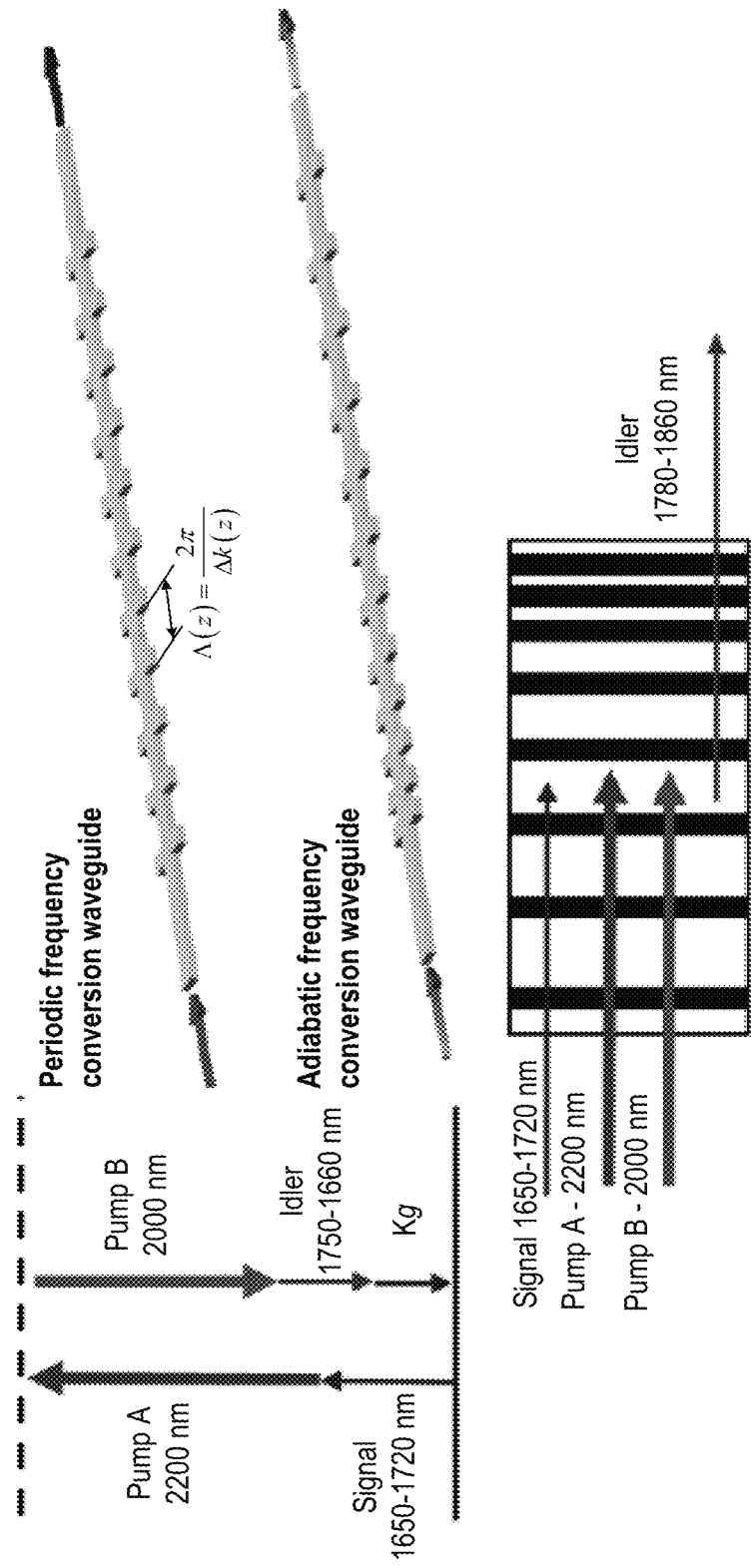
FIG. 4 shows the adiabatic frequency conversion in silicon photonic devices.

FIG. 4 shows the adiabatic frequency conversion in silicon photonic devices. The scheme allows an efficient broadband conversion of $\omega_{Signal}$ to $\omega_{idler}$ (and vice versa) by adiabatically changing the phase-mismatch parameter along the propagation in the nonlinear material (Bottom, Top Right). Each color is efficiently converted in a different location along the nonlinear crystal. We have shown a near 100% frequency conversion efficiency of an incoming signal, spanning from 1.65-1.72 um, which is the first solution for such a wide spectral width. An analogous picture of four-wave mixing from nonlinear optics corresponding to a two-level system induced by three-photon electromagnetic fields. The Kg stands for the added momenta arising from the modulated material (Top, Left).

FIGS. 5A-5D show simulation results for adiabatically modulated waveguide. Conversion efficiency per wavelength shows almost full conversion and is almost uniform for all wavelengths calculated in simulation (FIG. 5A) The idler intensity color plot, per wavelength, as a function of location in the waveguide, is shown to understand the separate locations in which each wavelength has its conversion jump (FIG. 5B). The sum of effective phase mismatch and added momenta due to modulation during propagation (FIG. 5C). Quasi-phase matched modulation for the central carrier wavelength is presented as reference—efficiency varies in a non-uniform manner including back conversion resulting in an output that is selective in wavelengths (FIG. 5D). Conversion efficiency as a function of signal wavelength, exhibiting for the adiabatically modulated waveguide (RAP) a flat conversion efficiency curve with a bandwidth of 70 nm, efficiency of the naive Quasi-phase matched modulation is presented as reference (QPM).

Figure 6A:
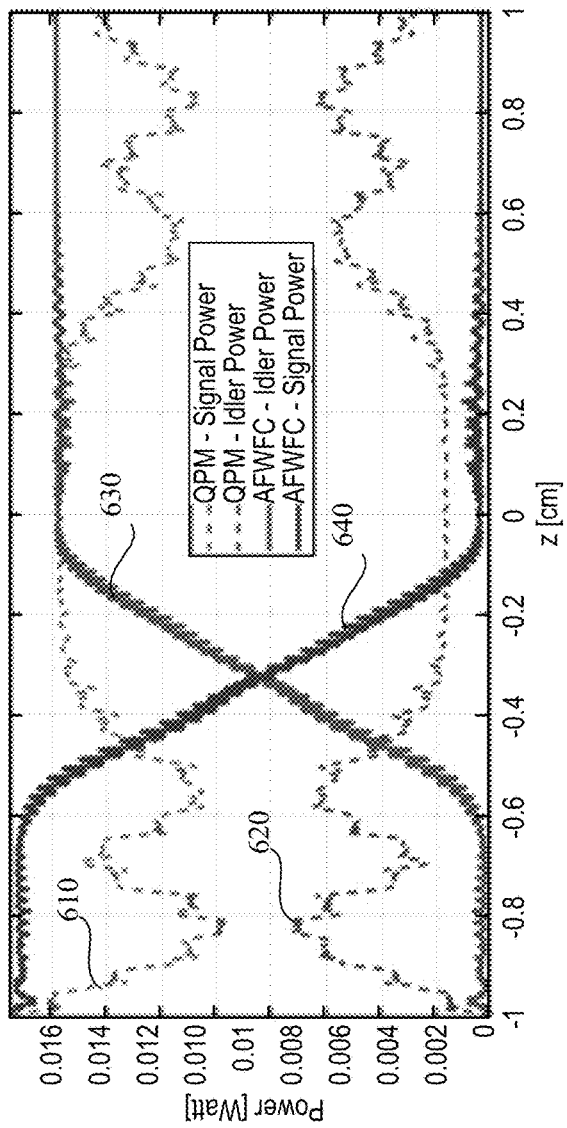
FIG. 6A shows Idler/Signal intensity during propagation in waveguide showing energy transfer between signal to idler during propagation.
Figure 6B:
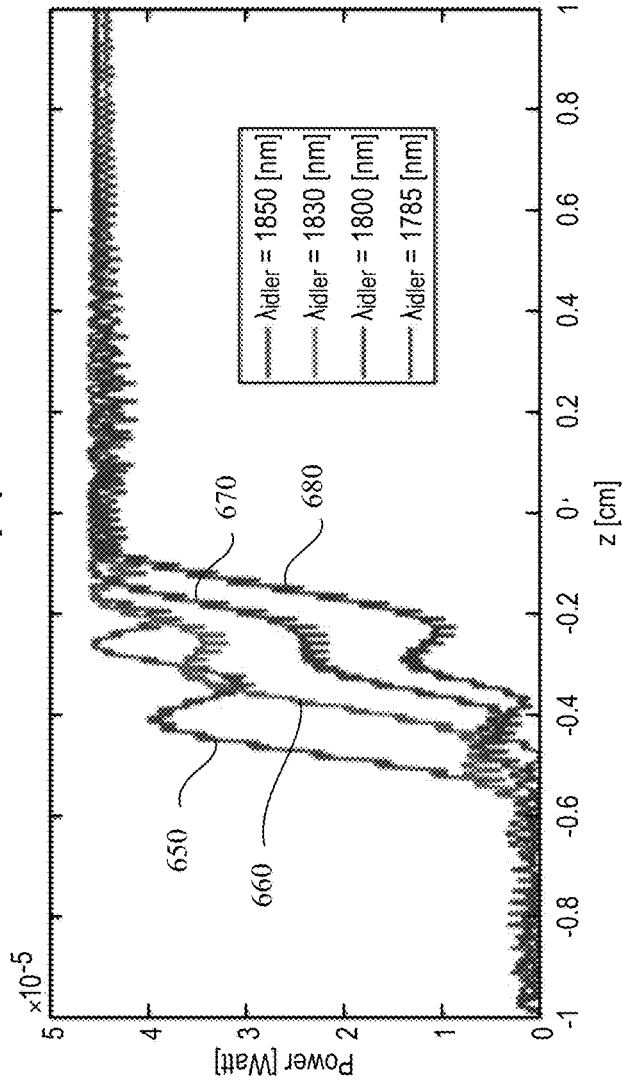
FIG. 6B shows cross-section example from FIGS. 5A-5D for various wavelengths.

FIG. 6A shows Idler/Signal intensity during propagation in waveguide showing energy transfer between signal to idler during propagation showing a convergence of energy transfer from signal to idler (640, 630), as reference, the naive quasi-phase-matched modulation is present (610, 620) and shows unwanted back conversion with efficiency which is non-uniform and very sensitive to various initial conditions. FIG. 6B shows cross-section example from FIGS. 5A-5D for various wavelengths. Convergence is apparent, while each wavelength has its own conversion jump location. Conversion jump location is further in prorogation location in the waveguide due to the modulation method chosen for this waveguide.

Rapid adiabatic passage in silicon photonics devices can be realized in several methods, each tailored by request. This could be achieved by tuning the effective momenta of the material by adiabatically changing the width of the waveguide thus changing the effective index of the material, starting with a very positive phase mismatch and ending with a very negative one. On the other hand, a chirped-periodic small change in width (Illustrated in FIG. 4) would affect the interaction constant, which can influence the phase mismatch and serve as a highly tunable knob, allowing for tunable insertion of momenta suitable for achieving energy transfer under agreement with the adiabatic condition and for arbitrary wide spectral widths. In order to demonstrate this method in simulation, we have calculated and solved our equations in the frequency domain using a 4th order Runge-Kutta method of solving coupled equation. To evaluate the conversion efficiency, we introduce the photon conversion ratio (PCR), defined as:

$$PCR = \frac{\text{idler final spectral density}}{\text{signal input spectral density}} \times \frac{\omega_s}{\omega_i}$$

Eq. (11)

where ωi and ωs are the frequencies of each signal-idler converted pair related by energy conservation. This definition is inherently normalized such that complete conversion of signal to idler corresponds to a PCR of 1. We will present a standard quasi-phase-matching solution with period matching the carrier frequency, and our adiabatic solution valid for >0.9 PCR for a broad range of frequencies entering the material illustrated in FIG. 4. For these simulation we used silica, in a waveguide with a tunable width of 1.5-1.55 microns, changing in a periodic manner with tunable periodicity. In this framework, minimal and maximal width of the waveguide are set as restrictions, for example as in a case of an on-chip device. Therefore, the main necessity in realizing energy transfer is to control a knob which changes the total phase mismatch along the waveguide while maintaining a minimal and maximal width (and while respecting equation 39). It is worth emphasizing that this kind of system can be also compatible to a different idler range simply by changing the modulation. For a bulk material (No modulation) the conversion efficiency is almost non-existing, the phase mismatch destroys any buildup of idler output. For the naively modulated waveguide, with modulation concept of QPM for the central carrier wavelength, efficiency varies in a non-uniform manner, resulting in an output that is selective in wavelengths (see FIGS. 5A-5D). Phase mismatch is almost constant during the propagation, due to a constant QPM condition, but there are noticeable oscillations in phase mismatch, due to the effective index corresponding to the width of the waveguide at that particular step. For the adiabatic solution, all wavelengths gradually converge to a final state value, due to the crossing of the phase mismatch while maintaining adiabaticity (FIG. 5A). Spanning from 1650 to 1720 nm, wavelengths are converted with very high efficiency and converge to that value where as for the naive QPM efficiency does not converge due to back conversion (See FIG. 6A). Induced oscillations in phase mismatch are also present for the adiabatic solution, and can been seen in FIG. 5B. As in the case of a QPM, oscillations in phase mismatch are the manifestation of the change in effective index due to modulation, which at this point are considered parasitic, but find use in different realizations of this method. In addition, the crossing is shifted from zero due to the cross modulation added momentum of the strong pump, similar to Stark shift, and also known as the Kerr effect. Intensity of broadband signal and idler during propagation in waveguide exhibits the robustness and superiority of power transfer in the adiabatic frequency conversion over the QPM scheme (FIG. 6A). Energy transfer is shifted in an adiabatic manner and converges to a final state. A cross section of idler intensity (FIG. 6A) is plotted for selected wavelengths in order to emphasize the convergence of this solution to a final state for all wavelengths (FIG. 6B).

2. Optical Fibers

Some embodiments of the disclosed technology can be used to implement AFWM in the simplest and most common fiber platform, step-index optical fibers (SIF). To achieve AFWM, a phase matching condition must first be found, and then a longitudinal variation in dispersion must be established such that $\Delta k_{eff}$ is scanned from large positive to large negative value (or vice versa). This can be achieved by tapering the fiber. For a long enough fiber that includes an adiabatic taper rate satisfying Eq. (6) for a wide bandwidth, efficient AFWM can also be achieved across a large bandwidth.

Some implementations focus mainly on FWM Scheme 1 from FIG. 3A. For SIF, strong dispersion and limited intensity (restricted by damage to fiber core) mean the contribution to phase mismatch from phase modulations $\Sigma_j \gamma_{i,j} P_j$ are generally much smaller than that from the propagation constants $\beta_i$. Therefore, we approximate $\Delta k_{eff} \approx \beta_A + \beta_{sig} - \beta_B - \beta_{Idl}$, and explore the conditions when $\Delta k_{eff} = 0$. In this realization, the second harmonic of Pump "A" is used as Pump "B". A signal with its wavelength between $Pump_A$ and $Pump_B$ is used to generate an idler wave with longer wavelength than the three input waves, which can result in near- to mid-IR generation given typical modern laser sources. Below, we investigate the cases where WA is 1.03, 1.55, or 2.0 µm.

Figure 7C:
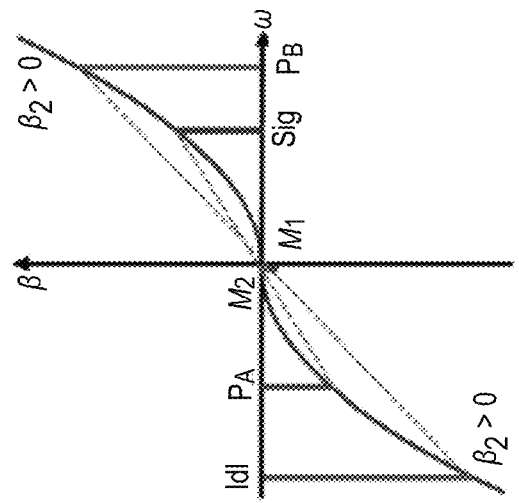
FIGS. 7A-7F show phase-matching diagrams for different zero-dispersion wavelength (ZDW) position relative to four waves.
Figure 7B:
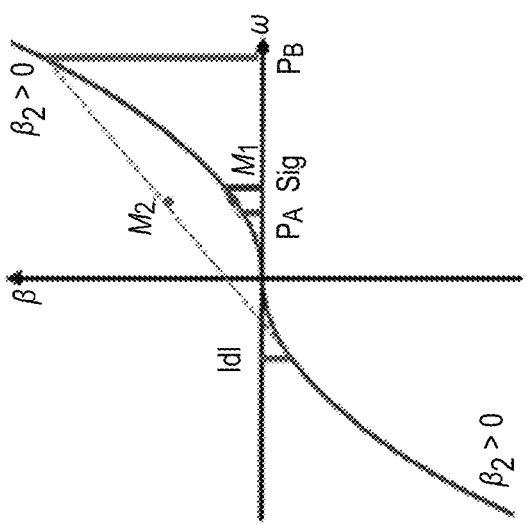
Figure 7A:
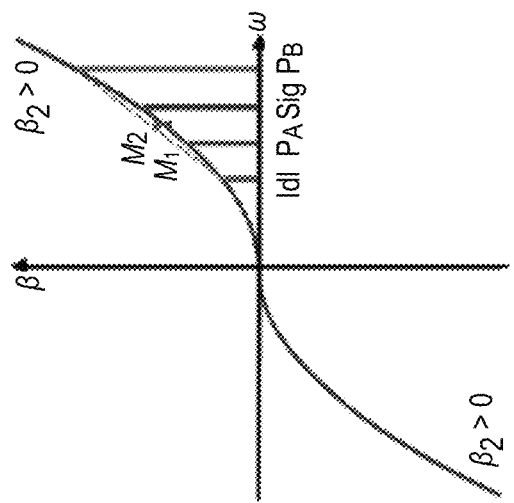
Figures 7D, 7E, 7F:
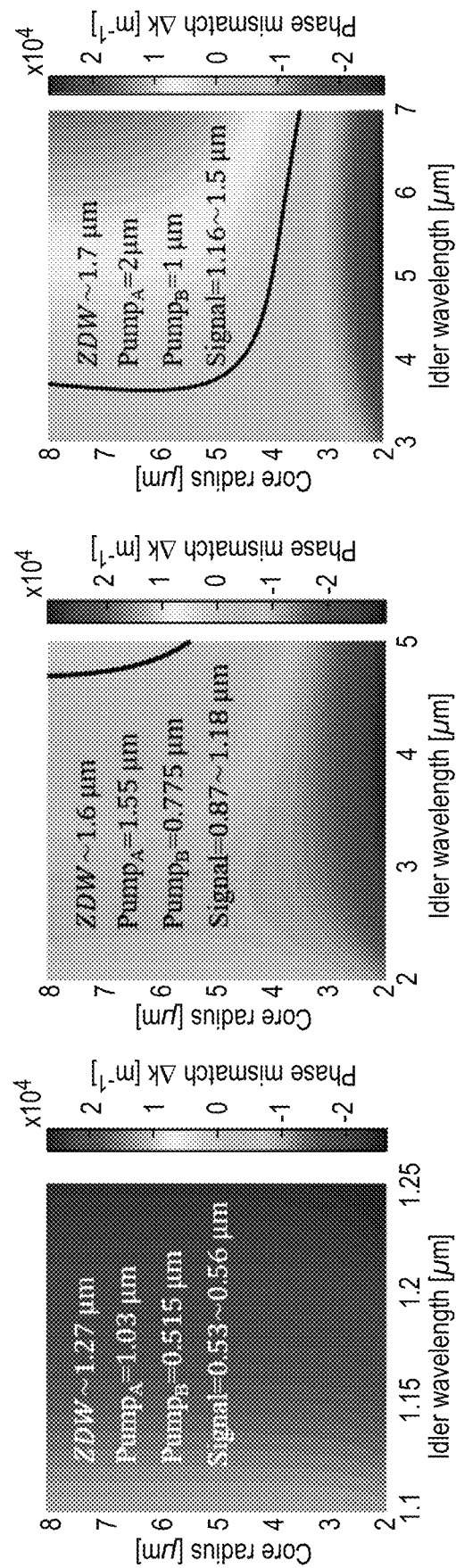

FIGS. 7A-7F show phase-matching diagrams for different zero-dispersion wavelength (ZDW) position relative to four waves from FIG. 3A ($\omega_A + \omega_{Sig} = \omega_B + \omega_{Idl}$). M1 and M2 denote the points such that $\beta M1 = (\beta A + \beta Sig)/2$ and $\beta M2 = (\beta B + \beta Idl)/2$, respectively, labeled as the middle points of the connecting line segments (grey dotted auxiliary lines). Therefore, phase matching $\Delta k_{eff} = \beta_A + \beta_{Sig} - \beta_B - R_{Idl} = 0$ requires overlapping of M1 and M2. FIG. 7A shows a case where all four waves are on one side of ZDW. No phase matching (overlapping of M1 and M2) is possible due to second-order dispersion (i.e. $\beta'' > 0$) at the mean frequency. FIG. 7D shows a phase mismatch contour plot representative of this case for a standard silica SIF. Case where one frequency is on the opposite side of the ZDW from the other three. Narrowband phase matching under limited conditions is possible, as shown in FIG. 7E for Thorlabs ZrF4 fiber. The black curve represents contour-zero. FIG. 7C shows a case where two waves are on each side of ZDW. Phase matching is most probable in this case, shown in FIG. 7F also for Thorlabs InF3 fiber, where an octave spanning idler wave covering 3.5~7 µm can be phase matched.

Consider a fiber with only one zero-dispersion wavelength (ZDW), as is the case for most commonly used SIFs. Plots of propagation constant β against optical frequency ω are shown in FIGS. 7A-7F for $Pump_A$ wavelengths corresponding to (a) Yb-doped, (b) Er-doped, and (c) Tm-doped fiber laser sources, along with standard silica fiber, ZrF4 fiber (Thorlabs P1-23Z models), and InF3 fiber (Thorlabs P1-32F models), respectively. M1 and M2 are middle points of the line segments connecting the β's of $Pump_A$ and Signal, and $Pump_B$ and Idler (grey dotted auxiliary lines in plots), respectively, such that: $\beta M1 = +\beta Sig/2$, $\beta M2 = \beta B + \beta Idl/2$. Idler (grey dotted auxiliary lines in plots), respectively, $\Delta k_{eff} = \beta A + \beta Sig - \beta B - \beta Idl = 0$, M1 and M2 need to overlap in the plots. $\beta''$ represents group-velocity dispersion of the fibers, as well as the second-order derivative (radius of curvature) of the plotted curves. If all four waves in AFWM are on one side of the ZDW, as shown in FIG. 7A, there will be no possibility for M1 and M2 to overlap, which is a result of the property for curves where $\beta'' > 0$ for all frequencies. (The same conclusion can be drawn if all four waves lie within the $\beta'' < 0$ region). This occurs in the example shown in FIG. 7D, where a standard silica SIF with NA 0.12 is used as the $\chi_{(3)}$ nonlinear platform, where a Yb-doped laser source and second harmonic set the pump wavelengths. For typical single-mode fibers core radii (2 8 µm), the ZDW 1.27 µm is longer than any wavelength of the four waves involved, and there is no phase-matching for a wide idler range. In contrast, if one wave is in the opposite side of ZDW with respect to the other three waves, as shown in FIG. 7B, overlap of M1 and M2 becomes possible, but only under a narrow range of parameters. This occurs for the case of an Er-doped laser source as $Pump_A$, where a Thorlabs ZrF4 fiber (NA 0.19) is modeled. For 2 8 µm core radii, the ZDW (1.6 µm) is between the idler wavelength and the other three wavelengths. Narrowband phase matching conditions (FIG. 7E) are achieved for only a small range of core radii. Finally, if there are two waves on each side of ZDW, the chance of M1 and M2 overlapping becomes much higher, as shown in FIG. 7C. This occurs for a Tm-doped pump laser source as $Pump_A$, where a Thorlabs InF3 fiber (NA~0.25) is modeled. As seen in FIG. 7F, for 2-8 µm core radii, the ZDW (1.7 µm) resides in the middle of the four waves' frequencies. An octave-spanning 3.5 7 µm idler wavelength can be phase matched over a core radius range from 4.5 µm to 3.5 µm. An adiabatic taper over this range may then allow an octave-spanning conversion bandwidth. Clearly, the case of FIG. 7C is desirable, with a ZDW lying between pairs of interacting wavelengths, to maximize the possibility for phase matching and broad phase matched bandwidth in a tapered SIF.

While $\Delta k_{eff}=0$ can be achieved for a broad range of idler frequencies in the case of FIG. 7C at different core sizes, in an untapered fiber, only one idler frequency can be phase matched. Thus, AFWM with a tapered fiber offers a route to dramatically increase the conversion bandwidth. To examine AFWM in tapered SIF with ultrashort pulses, we numerically solved the (1+1)-D generalized nonlinear Schrödinger equation (GNLSE) representing Scheme 1 ($\omega_A+\omega_{Sig}=\omega_B+\omega_{Idl}$):

$$\frac{dB(z,t)}{dz} = i\mathcal{F}^{-1}(\beta(z,\omega)B(z,\omega)) + i\mathcal{F}^{-1}(\gamma(\omega)\cdot\mathcal{F}(|B(z,t)|^2\cdot B(z,t))) \quad \text{Eq. (12)}$$

where B z, t is a single field envelope capturing all four mixing waves and B 0, t is the sum of all input field envelopes $B(0,t)=A_A(0,t)e^{-i\omega_B t}+A_B(0,t)e^{-i\omega_B t}+A_{sig}(0,t)e^{-i\omega_{Sig}t}$. The frequency grid used in the simulation covers a multi-octave bandwidth spanning from 450 nm to 9 µm. The propagation constant β (z, ω), which changes with the longitudinally varying core size, is numerically solved at each z-step for each frequency grid point. Thus the chromatic dispersion term (second term on the left-hand side) captures exact dispersion across the simulated frequency grid without making the Taylor series approximation. The term on the right-hand side (RHS) captures all possible FWM terms involving two created photons and two annihilated photons. This includes the desired interaction of Scheme 1 (ωA+ωSig=ωB+ωIdl), but also self-/cross-phase modulation (ωi+ωj=ωi+ωj), as well as unintended parametric FWM interactions, such as modulation instability and parametric amplification by degenerate/non-degenerate FWM, which can produce new and overlapping Fourier components. Only third harmonic generation and other 3→1 and 1→3 photon interactions (Scheme 2) are excluded, which are expected to be minimal due to large wave-vector mismatch. Thus, the GNLSE code simulation captures both intended and unintended FWM processes, giving guidance on choices of parameters that deliver optimal AFWM without exciting significant parasitic effects upon generation of the desired idler wave.

Figure 8A:
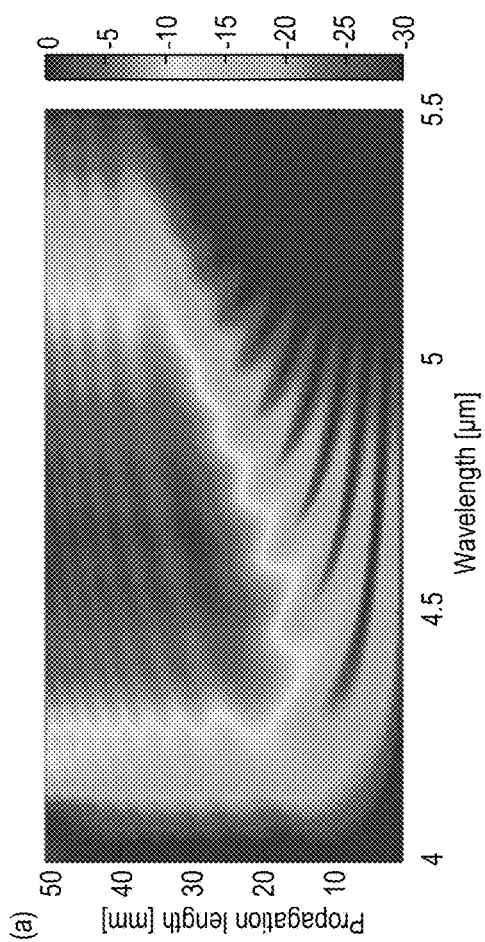
FIGS. 8A-8C show numerical solution of the (l+1)-D generalized nonlinear Schrödinger equation (GNLSE) for the parameters.
Figure 8C:
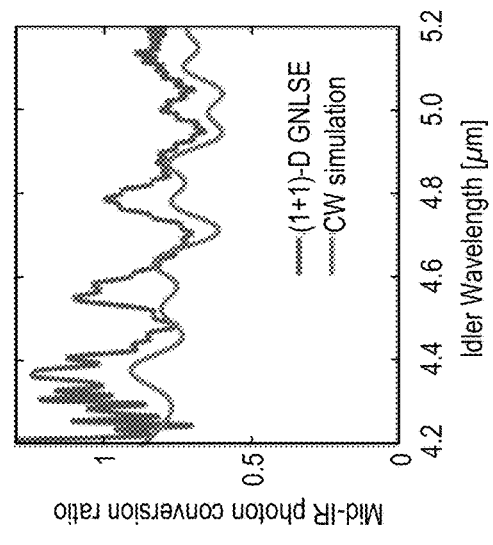
Figure 8B:
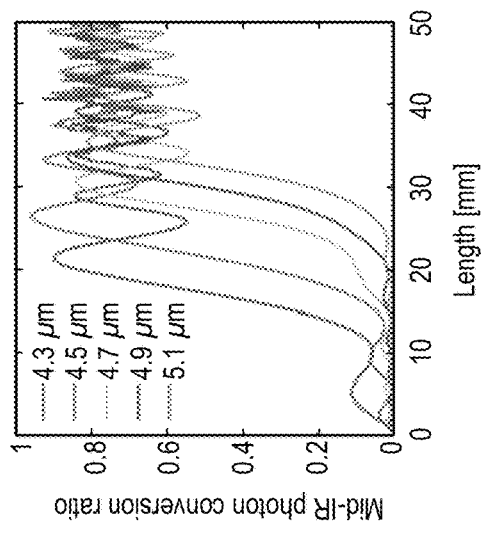

FIGS. 8A-8C show numerical solution of the (1+1)-D GNLSE for the parameters discussed above. FIG. 8A shows the power spectral density evolution of the 4 5.5 µm mid-IR region as the three input pulses propagate through the 5 cm long tapered fiber. The generated idler wave inherits the Gaussian spectral profile of the signal wave. PCR evolution for selected wavelengths is shown in FIG. 8B. We observe each mid-IR wavelength produced with RAP-like evolution dynamics, and with longitudinally varying conversion position, as expected due to the variation in core size where the $\Delta k_{eff}=0$ condition is encountered. PCR for the entire idler bandwidth 4.2 5.2 µm, which corresponds to the 1.36 1.44 µm input signal according to Scheme 1 (ωA+ωSig=ωB+ωIdl), is shown in FIG. 8C. PCR is above 0.7 for the full range. The simulated mid-IR pulse generation is centered at 4.7 µm and has an output energy of 5.5 nJ, with chirped 2 ps FWHM duration and 3 kW peak power. If fully compressed to its 43 fs TL duration, the mid-IR pulse can reach a peak power of 94 kW, thus indicating a new route to high peak power, fiber-based few-cycle pulse sources.

Some embodiments of the disclosed technology can be implemented based on adiabatic four-wave mixing in optical fiber. A robust, flat, broadband, efficient conversion may be implemented through tailored fiber design to fit the needs of future applications ranging from telecommunications to strong light-matter interaction science.

Figure 9:
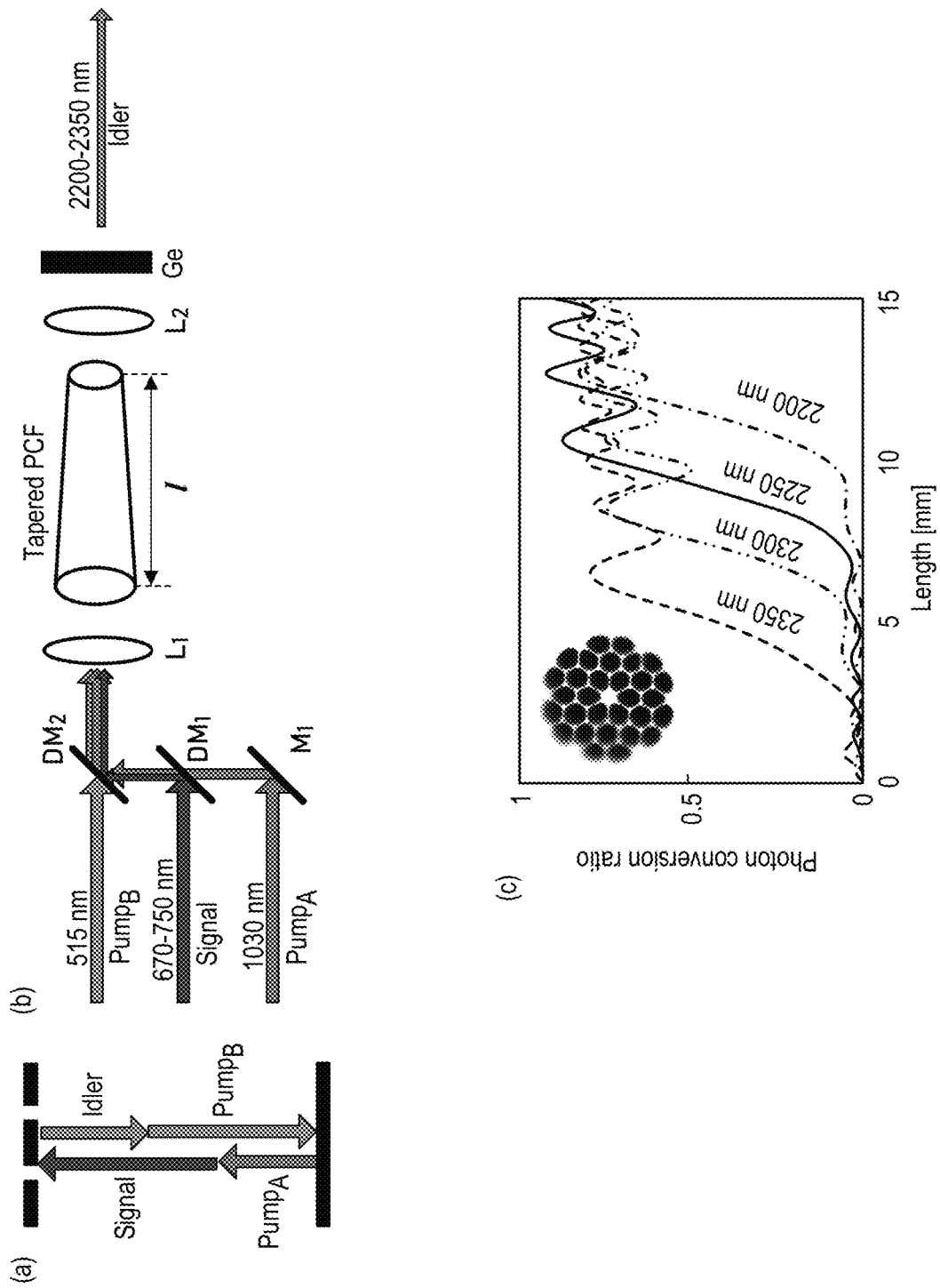
FIG. 9 shows (a) photon energy diagram of the FWM-BS process, (b) experimental setup of the proof-of-principle experiment for AFWM-FC, (c) numerically simulated photon conversion ratio vs. propagation length for selected MIR wavelengths.

FIG. 9 shows (a) photon energy diagram of the FWM-BS process, (b) experimental setup of the proof-of-principle experiment for AFWM-FC. high-reflectivity mirror. DM1, DM2: dichroic mirrors. achromatic lens. l: length of photonic crystal fiber (PCF). L2: aspheric lens. Ge: germanium window, (c) numerically simulated photon conversion ratio vs. propagation length for selected MIR wavelengths, demonstrating broadband, adiabatic, back-conversion free evolution. Inset: SEM image of the PCF used in the experiment.

The targeted FWM-BS process is ω_Idler=ω_(Pump_A)+ω_Signal-ω_(Pump_B) for frequency conversion transferring photons from a broadband near-infrared (NIR) signal to the MIR idler in the presence of two non-degenerate, relatively narrowband and intense pumps, as shown in FIG. 9 (a). For a proof of principle, 3 ps, 110 nJ (1100 µW average power), near-transform limited pulses at 1030 nm from a 10-kHz repetition rate Yb3+:YAG laser and 2 ps, 24 nJ (240 µW) pulses at the second harmonic (515 nm) served as Pump$_A$ and Pump$_B$, respectively. 1 ps, 2 nJ broadband signal pulses at 670-750 nm, generated from a NIR optical parametric chirped pulse amplifier driven by the same laser, were collinearly combined with both pumps using dichroic mirrors and sent into the tapered PCF using an achromatic lens, as shown in FIG. 9 (b). Extreme care was taken to excite only fundamental modes for all input waves. The tapered PCF had its core diameter tapered from 4.2 µm to 3.6 µm over a length l, designed to adiabatically convert a 700-716 nm NIR band to a 2.2-2.35 MIR band. Two samples, with l=1.5 cm and 3.5 cm, respectively, are investigated. The light from the output of the fiber was collimated by an aspheric lens with an anti-reflection coating suitable for collecting either NIR signal or MIR idler after the PCF and directing it to a spectrometer. For idler measurements, a subsequent Ge window filtered out any remaining pump or signal. FIG. 9 (c) shows the PCR evolution of selected wavelengths in the targeted MIR idler region, simulated for the l=1.5 cm PCF. These exhibit the characteristics of AFC: sequential, back-conversion-free, nearly full conversion of the targeted bandwidth.

In some embodiments of the disclosed technology, a device for generating broadband optical pulses includes an optical waveguide having different waveguide structures at different locations along the optical waveguide and with varying dimensions that change adiabatically along the different locations to enable non-linear four wave mixing over a broad spectral range. The optical waveguide includes a fiber that has a fiber core that has a spatially varying core size along the fiber to enable the non-linear four wave mixing over the broad spectral range. The non-linear four wave mixing is based on a rapid adiabatic passage realized by tuning effective momenta of a material of the optical waveguide by adiabatically changing a width of the waveguide to change an effective index of the material. In an implementation, the optical waveguide includes a tapered fiber having a negative wave-vector mismatch at an input port of the tapered fiber and a positive wave-vector mismatch at an output port of the tapered fiber. In another implementation, the optical waveguide includes a tapered fiber having a positive wave-vector mismatch at an input port of the tapered fiber and a negative wave-vector mismatch at an output port of the tapered fiber.

In some embodiments of the disclosed technology, an optical device for frequency conversion based on adiabatic four wave mixing to produce an idler laser beam includes a pump laser module to produce a pump laser beam having pump laser pulses at pump laser wavelengths, a signal laser beam module to produce a signal laser beam having signal laser pulses at a signal laser wavelength, a segment of fiber having an input port and an output port, the input port coupled to receive the signal laser beam and the pump laser beam to exhibit a spatially varying optical dispersion as an adiabatic four wave mixing medium to convert energy at the signal laser wavelength into the idler laser beam at a signal wavelength shorter than the signal laser wavelength, and an output port coupled to the output port of the segment of fiber to select the idler laser beam as an output of the optical device. The segment of fiber may include any type of fiber (e.g., spatially tapered fiber, spatially untapered fiber) in which a longitudinally varying spatial structure or pressure gradient can be used to satisfy a condition for adiabatic four wave mixing, wherein the condition for adiabatic four wave mixing includes $$|\dot{\kappa}\Delta k_{eff} - \kappa\Delta\dot{k}_{eff}| \ll (\kappa^2 + \Delta k_{eff}^2)^{\frac{3}{2}},$$

where $\Delta k_{eff}$ is an effective wave-vector mismatch, $\kappa$ is a coupling coefficient, and the derivatives are with respect to a propagation distance of light in the tapered fiber. A photon conversion ratio (PCR) of the segment of fiber is expressed by $1-\exp(-8\pi\kappa^2/|d\Delta k/dz|)$, where $\kappa=2\sqrt{\gamma_{sig}\gamma_{idl}P_A P_B}$ represents a nonlinear coupling strength and $|d\Delta k/dz|$ represents a sweeping rate of $\Delta k$, which is wave-vector mismatch for adiabatic four wave mixing, $\gamma_{sig}$ and $\gamma_{idl}$ are nonlinear coefficients for signal and idler waves, respective, and $P_A$ and $P_B$ are pump powers for pump light beams for the non-linear four wave mixing. The segment of fiber tapers from the input port towards the output port of the segment of fiber. The input port of the segment of fiber has a negative wave-vector mismatch and the output port of the segment of fiber has a positive wave-vector mismatch. The segment of fiber includes a photonic crystal fiber (PCF). The PCF includes an air-core. The PCF includes a solid core with high numerical apertures. The segment of fiber includes a hollow capillary fiber.

Figure 10A:
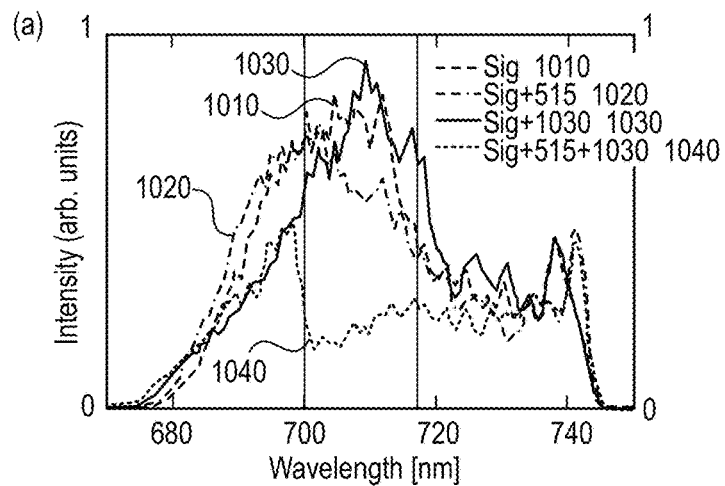
FIGS. 10A-10C show experimental results.
Figure 10B:
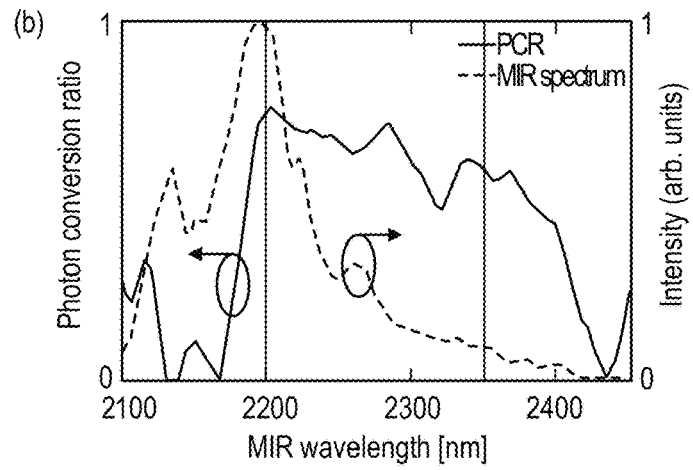
Figure 10C:
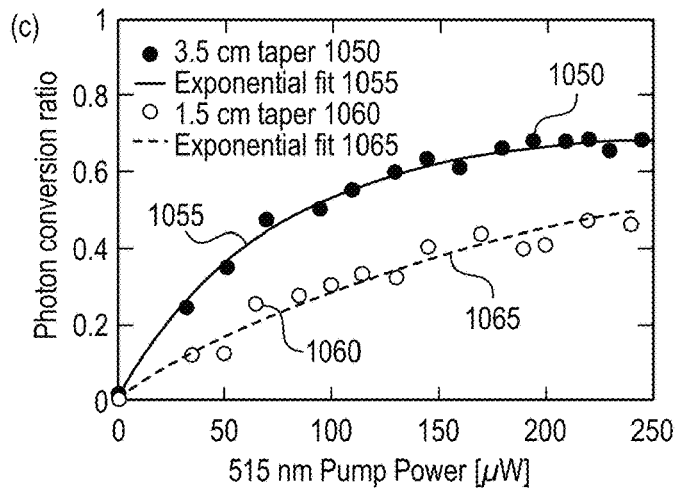

FIGS. 10A-10C show experimental results. FIG. 10A shows measured NIR signal spectra at PCF output under the presence of: no other beams (Sig), Pump$_B$ alone (Sig+515), Pump$_A$ alone (Sig+1030), and both pumps (Sig+515+1030). FIG. 10B shows MIR spectrum (left) captured under conditions when both pumps are present with the signal, and PCR (right) derived from depletion ratio shows with corresponding MIR idler wavelengths. Gray shaded areas in (a-b) are the targeted NIR-to-MIR conversion regions. FIG. 10C shows average PCR vs Pump$_B$ power in 700-705 nm NIR signal region and their exponential fit, for two tapered PCFs: l=1.5 cm (bottom curve) and 3.5 cm (top curve). Pump$_A$ power is fixed at 1100 µW for both experiments.

FIGS. 10A-10C presents the experimental proof of AFWM-FC. Spectra of the NIR signal are observed under various conditions for the l=3.5-cm long PCF, shown in FIG. 2(a). When the signal is mixed with either pumps (1030 nm Pump$_A$ or 515 nm Pump$_B$, but not both), spectral shifts and broadening can be observed on the signal spectra, showing clear signs of cross-phase modulation (XPM), but no prominent spectral depletion. Only when the signal is mixed with both pumps can significant signal depletion be observed for wavelengths from 700-716 nm, corresponding to the designed depletion region for the core diameter taper range of our PCFs. The corresponding PCR plotted on the MIR wavelength axis (calculated from the NIR signal depletion ratio in FIG. 10A with XPM effects taken into account) is shown in FIG. 10B (solid line) and is 0.6-0.7 across the targeted 2200-2350 nm MIR spectral region. The reduced and oscillating PCR observed for wavelengths outside the designed region exhibits the properties of incomplete AFC. The measured MIR spectrum (FIG. 10B, dotted line), exhibits a frequency blue shift we attribute to XPM experienced by the MIR idler before it exits the fiber, as indicated by simulations (not shown).

The PCR of adiabatic passage processes is characterized by a robust, back-conversion-free, saturating exponential increase as a function of pump powers as predicted by Landau-Zener (LZ) theory:

$$PCR_{LZ}=1-\exp(-8\pi\kappa^2/|d\Delta k/dz|) \qquad \text{Eq. (13)}$$

Here, $\kappa=2\sqrt{(\gamma_1\gamma_2 P_A P_B)}$ is the nonlinear coupling strength. $\gamma_i$, i=sig, idl, are nonlinear coefficients for signal and idler waves. $P_i$, i=A, B, are pump powers for Pump$_A$ and Pump$_B$, respectively. $|d\Delta k/dz|$ represents the sweeping rate of $\Delta k$—the position dependent wave-vector mismatch of the AFWM-FC process—along propagation length z. LZ theory predicts that if $|d\Delta k/dz| \ll \kappa^2$, evolution is fully adiabatic and PCR asymptotically reaches 1. PCR averaged from depletion in the 700-705 nm NIR signal region, measured as a function of 515 nm pump power, is plotted in FIG. 10C, with 1030 nm pump power fixed at 1100 µW. Two PCF taper lengths, l=1.5 cm and 3.5 cm, are tested to compare with Eq. (12) by fitting PCR data to the function y=A(1−exp[Bx]). With core diameter taper range (4.2 to 3.6 µm) fixed, the longer taper (3.5 cm, 1050) provides fully adiabatic evolution due to its small $|d\Delta k/dz|$, resulting in high (0.7) PCR, reaching the saturated region of the exponential curve. The excellent fit with the LZ function indicates full adiabatic conversion. However, the less than unity PCR indicates that some portion of the signal is unconverted, likely due to limited mode overlap in the PCF. In contrast, a shorter 1.5-cm taper (FIG. 10C, 1060) provides quicker evolution (larger $|d\Delta k/dz|$), and thus lower and unsaturated PCR due to less adiabaticity.

Examples provided in this document demonstrate a design for near-fully efficient, ultra-broadband frequency conversion that may be relevant to many optical fiber platforms and a wide range of wavelengths and applications, both at high repetition rate and at high pulse energy. Moreover, the promise of linear spectral amplitude and phase transfer functions, suggest wide applicability where ultrabroadband pulse shaping or few-cycle pulses are needed.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is what is disclosed and illustrated, including:

1. An optical device for frequency conversion based on adiabatic four wave mixing to produce an idler laser beam, comprising:
   a pump laser module to produce a pump laser beam having pump laser pulses at pump laser wavelengths;
   a signal laser beam module to produce a signal laser beam having signal laser pulses at a signal laser wavelength;
   a segment of fiber having an input port and an output port, the input port coupled to receive the signal laser beam and the pump laser beam to exhibit a spatially varying optical dispersion as an adiabatic four wave mixing medium to convert energy at the signal laser wavelength into the idler laser beam at an idler wavelength shorter than the signal laser wavelength, wherein the input port of the segment of fiber has a negative wave-vector mismatch and the output port of the segment of fiber has a positive wave-vector mismatch, or the input port of the segment of fiber has a positive wave-vector mismatch and the output port of the segment of fiber has a negative wave-vector mismatch; and
   an output port coupled to the output port of the segment of fiber to select the idler laser beam as an output of the optical device.

2. The device as in claim 1, wherein the segment of fiber includes a spatially tapered fiber with an adiabatic taper rate satisfying a condition for adiabatic four wave mixing, wherein the condition for adiabatic four wave mixing includes $$|\dot{\kappa}\Delta k_{\mathit{eff}} - \kappa\Delta \dot{k}_{\mathit{eff}}| \ll (\kappa^2 + \Delta k_{\mathit{eff}}^2)^{\frac{3}{2}},$$

wherein $\Delta k_{\mathit{eff}}$ is an effective wave-vector mismatch, wherein $\kappa$ is a coupling coefficient, and wherein the derivatives are with respect to a propagation distance of light in the tapered fiber.

3. The device as in claim 1, wherein a photon conversion ratio (PCR) of the segment of fiber is expressed by $1-\exp(-8\pi\kappa^2/|d\Delta k/dz|)$, wherein $\kappa=2\sqrt{\gamma_{sig}\gamma_{idl}P_A P_B}$ represents a nonlinear coupling strength and $|d\Delta k/dz|$ represents a sweeping rate of $\Delta k$, which is wave-vector mismatch for adiabatic four wave mixing,
   wherein $\gamma_{sig}$ and $\gamma_{idl}$ are nonlinear coefficients for signal and idler waves, respectively,
   and wherein $P_A$ and $P_B$ are pump powers for pump light beams for the non-linear four wave mixing.

4. The device as in claim 1, wherein the segment of fiber tapers from the input port towards the output port of the segment of fiber.

5. The device as in claim 1, wherein the segment of fiber includes a photonic crystal fiber (PCF).

6. The device as in claim 5, wherein the PCF includes an air-core.

7. The device as in claim 5, wherein the PCF includes a solid core with high numerical apertures.

8. The device as in claim 1, wherein the segment of fiber includes a hollow capillary fiber.

9. The device as in claim 1, wherein the segment of fiber includes a spatially untapered fiber with an adiabatic pressure gradient with rate satisfying a condition for adiabatic four wave mixing, wherein the condition for adiabatic four wave mixing includes $$|\dot{\kappa}\Delta k_{\mathit{eff}} - \kappa\Delta \dot{k}_{\mathit{eff}}| \ll (\kappa^2 + \Delta k_{\mathit{eff}}^2)^{\frac{3}{2}},$$

wherein $\Delta k_{\mathit{eff}}$ is an effective wave-vector mismatch, wherein $\kappa$ is a coupling coefficient, and wherein the derivatives are with respect to a propagation distance of light in the fiber.

10. The device as in claim 1, wherein the segment of fiber includes a type of fiber in which a longitudinally varying spatial structure or pressure gradient are used to satisfy a condition for adiabatic four wave mixing, wherein the condition for adiabatic four wave mixing includes $$|\dot{\kappa}\Delta k_{\mathit{eff}} - \kappa\Delta \dot{k}_{\mathit{eff}}| \ll (\kappa^2 + \Delta k_{\mathit{eff}}^2)^{\frac{3}{2}},$$

wherein $\Delta k_{\mathit{eff}}$ is an effective wave-vector mismatch, wherein $\kappa$ is a coupling coefficient, and wherein the derivatives are with respect to a propagation distance of light in the fiber.

11. An optical device for adiabatic frequency conversion of light, comprising:
   an optical path to combine signal beam and first and second pump beams; and
   an optical waveguide including an input port and an output port, the input port directing the combined signal beam and first and second pump beams, the optical waveguide structured to have a spatial tapering from the input port towards the output port with an adiabatic taper rate to cause adiabatic four wave mixing which produces an idler beam at an idler wavelength different from wavelengths of the signal beam and the first and second pump beams,
   wherein the input port of the optical waveguide has a negative wave-vector mismatch and the output port of the segment of fiber has a positive wave-vector mismatch, or the input port of the optical waveguide has a positive wave-vector mismatch and the output port of the segment of fiber has a positive wave-vector mismatch.

12. The device as in claim 11, wherein the optical waveguide is structured for the adiabatic four wave mixing to satisfy $$|\dot{\kappa}\Delta k_{\mathit{eff}} - \kappa\Delta \dot{k}_{\mathit{eff}}| \ll (\kappa^2 + \Delta k_{\mathit{eff}}^2)^{\frac{3}{2}},$$

wherein $\Delta k_{\mathit{eff}}$ is an effective wave-vector mismatch, wherein $\kappa$ is a coupling coefficient, and wherein the derivatives are with respect to a propagation distance of light in the tapering.

13. The device as in claim 11, wherein the optical waveguide includes a fiber that has a fiber core that has a spatially varying core size along the fiber to enable the non-linear four wave mixing over the broad spectral range.

14. The device as in claim 11, wherein the fiber includes a photonic crystal fiber (PCF).

15. The device as in claim 14, wherein the PCF includes an air-core.

16. The device as in claim 14, wherein the PCF includes a solid core with high numerical apertures.

17. The device as in claim 11, wherein the fiber includes a hollow capillary fiber.

* * * * *